United States Patent
Cho et al.

(10) Patent No.: US 11,978,223 B2
(45) Date of Patent: May 7, 2024

(54) ELECTRONIC DEVICE INCLUDING PROCESSING CIRCUIT FOR GENERATING DEPTH INFORMATION USING LUMINANCE DATA AND METHOD OF GENERATING DEPTH INFORMATION

(71) Applicant: Samsung Electronics Co., Ltd., Suwon-si (KR)

(72) Inventors: Soonyong Cho, Yongin-si (KR); Yoojeong Seo, Hwaseong-si (KR); Seokhyeon Lee, Hwaseong-si (KR); Yongkoo Park, Hwaseong-si (KR); Suyoung Lee, Daejeon (KR); Kilwoo Chung, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 192 days.

(21) Appl. No.: 17/556,472

(22) Filed: Dec. 20, 2021

(65) Prior Publication Data

US 2022/0343523 A1 Oct. 27, 2022

(30) Foreign Application Priority Data

Apr. 26, 2021 (KR) .................. 10-2021-0053756

(51) Int. Cl.
*G06T 7/529* (2017.01)
*G06T 7/55* (2017.01)
*H04N 25/00* (2023.01)

(52) U.S. Cl.
CPC .............. *G06T 7/529* (2017.01); *G06T 7/55* (2017.01); *H04N 25/00* (2023.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | |
|---|---|---|
| 9,445,018 B2 | 9/2016 | Fettig et al. |
| 10,148,864 B2 | 12/2018 | Wang et al. |
| 10,362,296 B2 | 7/2019 | Price et al. |

(Continued)

FOREIGN PATENT DOCUMENTS

| | | |
|---|---|---|
| JP | 2006172381 A | 6/2006 |
| KR | 101119941 B1 | 3/2012 |

(Continued)

OTHER PUBLICATIONS

CES 2020: Samsung's invisible keyboard for smartphones, https://www.bbc.com/news/av/technology-51057261/ces-2020-samsung-s-invisible-keyboard-for-smartphones, Jan. 9, 2020.

*Primary Examiner* — Xiaolan Xu
(74) *Attorney, Agent, or Firm* — Muir Patent Law, PLLC

(57) ABSTRACT

Disclosed is an electronic device configured to generate depth information. The electronic device includes: a memory storing one or more instructions and image data; and at least one processing circuit configured to generate the depth information on the image data by executing the one or more instructions, wherein the at least one processing circuit is further configured to obtain luminance data of the image data, generate absolute depth data for the luminance data by using a first artificial neural network configured to extract disparity features, and generate the depth information based on the absolute depth data.

19 Claims, 21 Drawing Sheets

(56) References Cited

U.S. PATENT DOCUMENTS

| | | | |
|---|---|---|---|
| 2018/0213170 A1* | 7/2018 | Segawa | H01L 27/146 |
| 2020/0098139 A1* | 3/2020 | Kaplanyan | G06T 3/00 |
| 2020/0145642 A1* | 5/2020 | Yu | G06T 5/50 |
| 2020/0160559 A1 | 5/2020 | Urtasun et al. | |
| 2022/0398705 A1* | 12/2022 | Martin Brualla | G06T 15/20 |

FOREIGN PATENT DOCUMENTS

| | | |
|---|---|---|
| KR | 101207862 B1 | 12/2012 |
| KR | 1020200056709 A | 5/2020 |

* cited by examiner $$y_i = f\left(\sum_{j=1}^{m} w_{j,i} \cdot x_j\right)$$

ELECTRONIC DEVICE INCLUDING PROCESSING CIRCUIT FOR GENERATING DEPTH INFORMATION USING LUMINANCE DATA AND METHOD OF GENERATING DEPTH INFORMATION

CROSS-REFERENCE TO RELATED APPLICATION

This application is based on and claims priority under 35 U.S.C. § 119 to Korean Patent Application No. 10-2021-0053756, filed on Apr. 26, 2021, in the Korean Intellectual Property Office, the disclosure of which is incorporated by reference herein in its entirety.

BACKGROUND

The inventive concept relates to a processing circuit for generating depth information, and more particularly, to an electronic device including a processing circuit for generating depth information using luminance data, and a method of generating the depth information.

As complementary metal-oxide semiconductor (CMOS) image sensors are widely mounted on portable electronic devices, sharp images are desirable in various imaging environments. In order for a sharp image to be captured in a low-illuminance environment, depth information on an object needs to be accurate.

Although time-of-flight (TOF) sensors are generally used to obtain depth information, there are disadvantages in that a large space is required and costs and power consumption are increased. Also, common RGB-based CMOS image sensors are vulnerable to low illuminance.

SUMMARY

Various aspects of the inventive concept provide a processing circuit capable of obtaining accurate depth information even at low illuminance, an electronic device including the processing circuit, and a method of generating the depth information.

According to an aspect of the inventive concept, an electronic device is configured to generate depth information and includes: a memory storing one or more instructions and image data; and at least one processing circuit configured to generate the depth information on the image data by executing the one or more instructions, wherein the at least one processing circuit is further configured to obtain luminance data of the image data, generate absolute depth data for the luminance data by using the luminance data and a first artificial neural network configured to extract disparity features, and generate the depth information based on the absolute depth data.

According to another aspect of the inventive concept, an electronic device includes: an image sensor configured to sense an object by using a plurality of photoelectric conversion elements and generate image data having disparity, wherein at least two of the plurality of photoelectric conversion elements share one microlens; a memory storing one or more instructions and the image data; and at least one processing circuit configured to generate depth information on the image data by executing the one or more instructions, wherein the at least one processing circuit is configured to generate absolute depth data for the image data by using a first artificial neural network configured to estimate an absolute depth of the image data, generate relative depth data for the absolute depth data by using a second artificial neural network configured to estimate a relative depth based on a shape of a scene corresponding to the image data, and generate the depth information by fusing the absolute depth data with the relative depth data by using a third artificial neural network.

According to another aspect of the inventive concept, a method, performed by a processing circuit, of generating depth information on image data, includes: obtaining, from a memory, luminance data conforming to a YUV format from the image data; generating absolute depth data by applying disparity feature learning to the luminance data by using a first artificial neural network; generating relative depth data by applying scene learning by using a second artificial neural network; and generating the depth information by fusing the absolute depth data with the relative depth data by using a third artificial neural network.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept will be described in detail with reference to the accompanying drawings.

Figure 1:
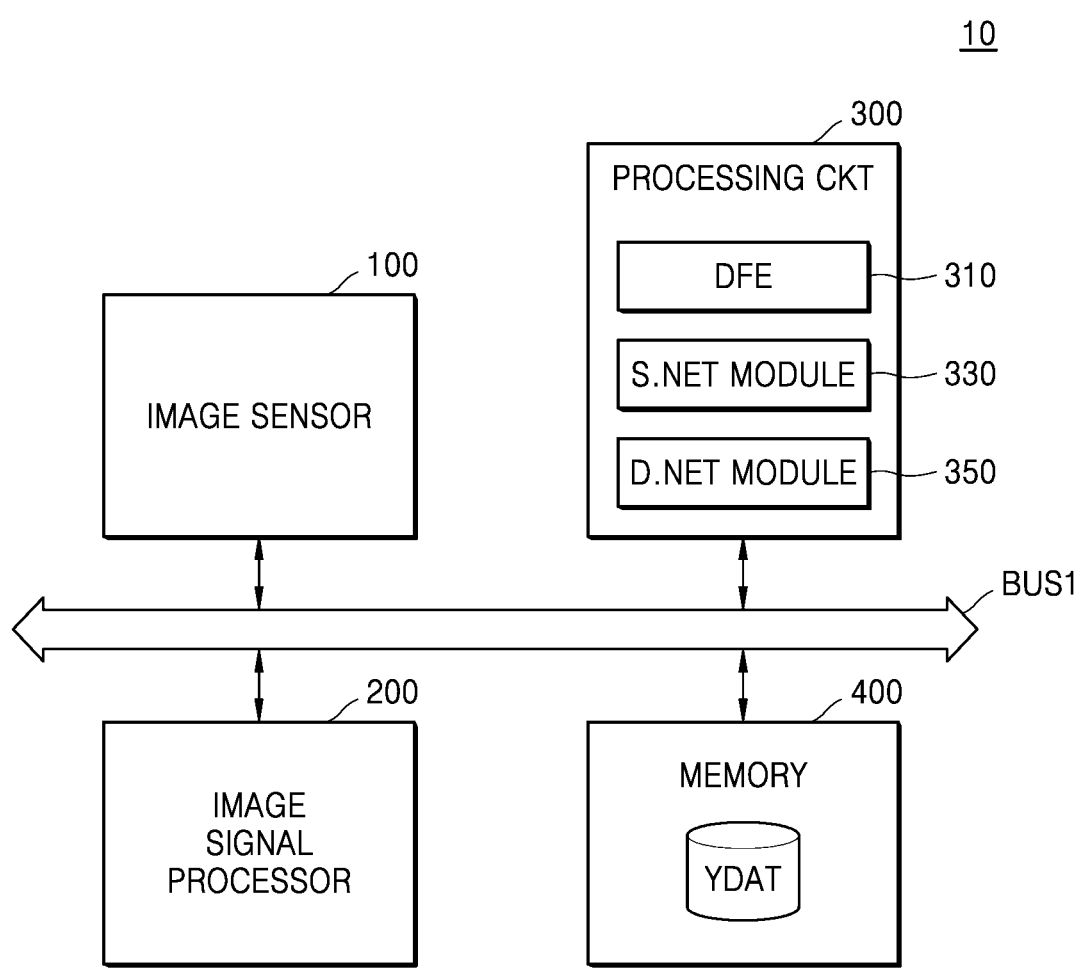
FIG. 1 is a block diagram illustrating an electronic device including a processing circuit, according to an example embodiment of the inventive concept.

FIG. 1 is a block diagram illustrating an electronic device 10 including a processing circuit, according to an example embodiment of the inventive concept.

Referring to FIG. 1, the electronic device 10 may process data through interaction of hardware and software, and may provide a processing result to a user. The electronic device 10 may provide a physical basis on which the software is executed, and a result intended by the user may be derived by using resources of the hardware. In an example embodiment, the electronic device 10 may execute application software through an operating system (OS), and an operation result according to the execution may be stored in a memory 400. In this case, the electronic device 10 may be referred to as a computing system.

The electronic device 10 may include an image sensor 100, an image signal processor (ISP) 200, a processing circuit 300, and the memory 400, and may communicate with each component through a first bus BUS1.

The image sensor 100 may be mounted on an electronic device having an image or optical sensing function. For example, the image sensor 100 may be mounted on or in an electronic device such as a camera, a smartphone, a wearable device, an Internet of Things (IoT) device, a tablet personal computer (PC), a personal digital assistant (PDA), a portable multimedia player (PMP), a navigation device, or the like. In addition, the image sensor 100 may be mounted on or in an electronic device provided as a part in a vehicle, furniture, manufacturing equipment, a door or doorbell, or various measurement equipment.

The image sensor 100 may convert an optical signal of an object incident through an optical lens into an electrical signal, and may generate image data based on electrical signals and output the image data to the outside (e.g., outside of the image sensor 100). The image sensor 100 may include, for example, a pixel array including a plurality of two-dimensionally arranged pixels and a readout circuit, and the pixel array may convert received optical signals into electrical signals.

The pixel array may be implemented as, for example, a photoelectric conversion element such as a charge-coupled device (CCD) or a complementary metal-oxide semiconductor (CMOS), or one of other various kinds of photoelectric conversion elements. The photoelectric conversion element may generate photocharges that vary according to the intensity of incident light. For example, the photoelectric conversion element may include a photodiode, a phototransistor, a port gate, or a pinned photodiode. For example, a photodiode PD as a P-N junction diode may generate charges, that is, electrons that are negative charges and holes that are positive charges, in proportion to the amount of incident light.

A microlens and a color filter may be laminated on an upper part of each of the plurality of pixels. In an example embodiment, each of the plurality of pixels may sense an object by using at least two photoelectric conversion elements. For example, each of the plurality of pixels may include at least one first photoelectric conversion element arranged in a left direction (or an upward direction) with respect to an optical axis of the microlens and at least one second photoelectric conversion element arranged in a right direction (or a downward direction) with respect to the optical axis of the microlens. Each of the plurality of pixels may output a first image signal generated by the first photoelectric conversion element or a second image signal generated by the second photoelectric conversion element. Disparity, which is a phase difference between first and second image signals for the same object sensed by a pair of photoelectric conversion elements, may be included in image data. As used herein, a pixel including two photoelectric conversion elements that share one microlens will be referred to as a dual pixel. A structure of the dual pixel will be described in detail with reference to FIGS. 13A to 13D.

The readout circuit may output data on which pre-processing such as removal of bad pixels has been performed, based on the electrical signal provided from the pixel array, as image data. The image sensor 100 may be implemented as a semiconductor chip or package including a pixel array and a readout circuit.

The ISP 200 may perform image processing on the image data provided from the image sensor 100. For example, the ISP 200 may perform, on the image data, image processing for changing a data format (for example, changing image data in a Bayer pattern into a YUV or RGB format), or image processing for improving image quality such as noise removal, brightness adjustment, or sharpness adjustment. A structure of the ISP 200 will be described in detail with reference to FIG. 3.

According to an example embodiment, the ISP 200 may convert image data sensed in the Bayer format to the RGB format or the YUV format. According to an example embodiment of the inventive concept, the ISP 200 may generate luminance data YDAT and chrominance data UDAT and VDAT, as a result of processing the image data. The luminance data YDAT and the chrominance data UDAT and VDAT may be stored in the memory 400.

The processing circuit 300 may process overall operations of the electronic device 10, in particular, requests of other components constituting the electronic device 10 (for example, the image sensor 100, the ISP 200, and the memory 400), and may control the other components. In an example embodiment, the processing circuit 300 may perform a specific task, an instruction, or an operation. In an example embodiment, the instruction may be loaded from the memory 400. For example, computer program code may be used to implement some of the functions of the processing circuit 300.

In an example embodiment, the processing circuit 300 may be implemented as a general purpose processor, a dedicated processor, an application processor (AP), or the like. In an example embodiment, the processing circuit 300 may be implemented as an operating processor (for example, a central processing unit (CPU), a graphics processing unit (GPU), a neural processing unit (NPU), an AP, or the like) including a dedicated logic circuit (for example, a field programmable gate array (FPGA), an application specific integrated circuit (ASIC), or the like), but is not limited thereto.

The processing circuit 300 may further include an accelerator which is a dedicated circuit for high-speed data operation such as artificial intelligence (AI) data operation, and the accelerator may include a GPU, an NPU, and/or a digital signal processor (DSP). According to an example embodiment, the accelerator may be implemented as a separate chip that is physically independent of other components of the processing circuit 300. According to an example embodiment, the processing circuit 300 may process data by using one or more artificial neural networks. In addition, the processing circuit 300 may enhance the one or more artificial neural networks by learning data through the one or more artificial neural networks.

A function related to AI according to the inventive concept may be operated through at least one processing circuit 300 and the memory 400. The processing circuit 300 may be a general purpose processor such as a CPU, an AP, or a DSP, a graphics-dedicated processor such as a GPU or a vision processing unit (VPU), or an AI-dedicated processor such as an NPU. The processing circuit 300 may control processing of input data according to a predefined operation rule or an AI model stored in the memory 400. When the processing circuit 300 is an AI-dedicated processor, the AI-dedicated processor may be designed with a hardware structure specialized for processing a specific AI model. The predefined operation rule or the AI model is created through learning. Here, the expression "to be created through learning" means that a basic AI model is trained using a plurality of learning data pieces by a learning algorithm, such that a predefined operation rule or an AI model set to perform a desired feature (or purpose) is created. Such learning may be carried out in a device on which the AI according to the inventive concept is performed, or may be carried out through a separate server and/or system. An example of the learning algorithm may be supervised learning, unsupervised learning, semi-supervised learning, or reinforcement learning, but is not limited thereto.

The artificial neural network may include a deep neural network (DNN), for example, a convolutional neural network (CNN), a recurrent neural network (RNN), a restricted Boltzmann machine (RBM), a deep belief network (DBN), a bidirectional recurrent deep neural network (BRDNN), or a deep Q-network, but is not limited thereto.

The artificial neural network may be composed of a plurality of neural network layers. Each of the plurality of neural network layers has a plurality of weight values, and performs a neural network operation through an operation between an operation result of a previous layer and the plurality of weight values. The plurality of weight values of the plurality of neural network layers may be optimized by a learning result of the AI model. For example, the plurality of weight values may be updated such that a loss value or a cost value obtained from the AI model during a learning process is reduced or minimized. The artificial neural network will be described in detail with reference to FIGS. 7A to 7C.

According to an example embodiment of the inventive concept, the processing circuit 300 may include a disparity feature extractor (DFE) 310, a scene network (S.NET) module 330, and a disparity network (D.NET) module 350.

A pair of pieces of image data may be input to the DFE 310, and as a result, one piece of output data including a feature may be generated. In an example embodiment, the DFE 310 may extract, by using an artificial neural network, features such as borders, lines, colors, edges (boundaries of an object), density (including a dense state and a sparse state), and depths from an input image. As used herein, an image having a dense (e.g., high) density will be referred to as a textured image, and an image having a sparse (e.g., low) density will be referred to as an untextured image. The textured image may correspond to a high frequency, and the untextured image may correspond to a low frequency.

The DFE 310 may learn in advance about the density of an image by using the artificial neural network. For example, the DFE 310 may learn in advance about a high-density image (that is, a textured image) by using the artificial neural network, and performance of edge detection on input data may be improved according to a learning result.

In an example embodiment, the DFE 310 may estimate an absolute depth for an input data pair having disparity. For example, the DFE 310 may generate absolute depth data as a result of extracting features of the input data pair.

According to an example embodiment of the inventive concept, the luminance data YDAT may be input to the DFE 310 such that an absolute depth of the luminance data YDAT may be estimated.

One piece of data may be input to the S.NET module 330, and as a result, one piece of output data including a feature may be generated. The S.NET module 330 may process an input image by using an artificial neural network configured to learn overall features of a scene. A scene network S.NET, which is an artificial neural network that learns overall features of a scene, may be implemented in a pyramid structure. According to an example embodiment, the S.NET module 330 may perform encoding on a scene corresponding to image data while sequentially decreasing a resolution thereof, and may perform decoding while sequentially increasing the resolution until returning to the initial resolution. For example, the scene network S.NET may have five to six encoding and decoding stages. As a result of performing the encoding while sequentially decreasing the resolution, the scene network S.NET may learn features for all resolutions representing the scene. For example, the artificial neural network used by the S.NET module 330 may be PyDNet, but the inventive concept is not limited to a particular model or a particular embodiment.

According to an example embodiment of the inventive concept, the S.NET module 330 may estimate a relative depth of the input image by using the scene network S.NET. For example, the S.NET module 330 may be provided with the absolute depth data output from the DFE 310, and relative depth data may be generated as a result of processing of the absolute depth data by the scene network S.NET. By estimating a relative depth for a low-density image (that is, an untextured image), the S.NET module 330 may obtain a relatively accurate depth even for image data having a relatively small disparity.

One piece of data may be input to the D.NET module 350, and as a result, one piece of output data including a feature may be generated. The D.NET module 350 may fuse the relative depth data with the absolute depth data by using an artificial neural network. A disparity network D.NET, which is an artificial neural network that generates final depth data by fusing the relative depth data with the absolute depth data, may include an activation layer and a plurality of convolution layers, the activation layer including at least one rectified linear unit (ReLU) function. For example, the disparity network D.NET may be composed of five stages, each stage having one convolution layer and one activation layer.

According to an example embodiment of the inventive concept, the D.NET module 350 may fuse the relative depth data with the absolute depth data by using the disparity network D.NET. For example, the D.NET module 350 may be provided with the absolute depth data output from the DFE 310 and the relative depth data output from the S.NET module 330, and final depth data may be generated as a result of processing by the disparity network D.NET. The final depth data may be converted into depth information through processing by a post-processing layer (not shown).

As used herein, the DFE 310, the S.NET module 330, and the D.NET module 350 may be implemented as a combination of hardware, firmware, and/or software. For example, the DFE 310, the S.NET module 330, and the D.NET module 350 may each be implemented as a processing circuit, such as hardware including a logic circuit, or may be implemented as a combination of hardware and software, such as a processor running software that performs a processing operation of an artificial neural network.

According to an example embodiment of the inventive concept, the luminance data YDAT may be robust to a low-illuminance environment even after being processed by the artificial neural network, compared to image data in the RGB format. According to an example embodiment of the inventive concept, the processing circuit 300 may use the luminance data YDAT as an input, and a depth estimation result that is a processing result of the at least one artificial neural network used in the processing circuit 300 may be enhanced, compared to a case of using the image data in the RGB format.

The memory 400 may store data generated or processed by the image sensor 100, the ISP 200, and/or the processing circuit 300, and may provide the stored data to the ISP 200 and/or the processing circuit 300. The memory 400 may store instructions for an OS, an application, and a processing operation of the electronic device 10.

According to an example embodiment, the memory 400 may be a working memory that exchanges data in real time with the processing circuit 300. For example, the memory 400 may include, as a volatile memory, dynamic random-access memory (DRAM), static random-access memory (SRAM), mobile DRAM, double data rate synchronous dynamic random access memory (DDR SDRAM), low power DDR (LPDDR) SDRAM, graphic DDR (GDDR) SDRAM, rambus dynamic random-access memory (RDRAM), or the like. However, this is merely an example embodiment, and the inventive concept does not exclude that the memory 400 may include a non-volatile memory.

For example, the memory 400 may be a storage device that stores the data generated or processed by the image sensor 100, the ISP 200, and/or the processing circuit 300 in a non-volatile manner. In an example embodiment, the memory 400 may include, as a non-volatile memory, electrically erasable programmable read-only memory (EEPROM), flash memory, phase change random-access memory (PRAM), resistance random-access memory (RRAM), nano-floating gate memory (NFGM), polymer random-access memory (PoRAM), magnetic random-access memory (MRAM), ferroelectric random-access memory (FRAM), or the like.

According to an example embodiment of the inventive concept, the memory 400 may store the luminance data YDAT. The luminance data YDAT is generated by the ISP 200 as part of image data conforming to the YUV format. The luminance data YDAT and the chrominance data UDAT and VDAT may be separately stored in logically or physically separated spaces within the memory 400. According to an example embodiment, the processing circuit 300 may use only the luminance data YDAT among the image data in the YUV format.

The first bus BUS1 may relay data communication between the image sensor 100, the ISP 200, the processing circuit 300, and the memory 400. In an example embodiment, the first bus BUS1 may relay transmission and reception of control signals, data, and addresses between the image sensor 100, the ISP 200, the processing circuit 300, and the memory 400 by using a bus type such as an address bus, a control bus, or a data bus.

The electronic device 10 including the image sensor 100, the ISP 200, the processing circuit 300, the memory 400, and the first bus BUS1 as shown in FIG. 1 may be implemented as a system-on-chip (SOC). The SOC is a semiconductor chip including a hardware module required for driving the electronic device 10 with a single chip (or a group or stack of chips part of a single package). In an example embodiment, the SOC may be mounted by combining an application required for performing a function of each of a plurality of hardware modules with internal software. The application (or program) may be application software that performs a specific purpose. According to an example embodiment, the application may be executed by using at least one function. The application may be built by executing source code. By using the SOC, space in which each element is mounted on a substrate may be reduced such that product miniaturization may be possible, and manufacturing costs may be reduced compared to producing various functional elements separately.

The processing circuit 300 according to an example embodiment of the inventive concept may reduce memory usage and power consumption by training an artificial neural network with only the luminance data YDAT among the YUV data.

In addition, because the processing circuit 300 according to an example embodiment of the inventive concept does not need to convert data that has already been converted to the YUV format back to the RGB format, data processing speed may be improved.

In addition, the processing circuit 300 according to the example embodiment of the inventive concept may improve the accuracy of depth estimation even in a low-illuminance environment by using the luminance data YDAT.

In addition, because the processing circuit 300 according to an example embodiment of the inventive concept may estimate a depth considering a relative depth even for image data having a small disparity, the accuracy of depth estimation may be improved.

Figure 2:
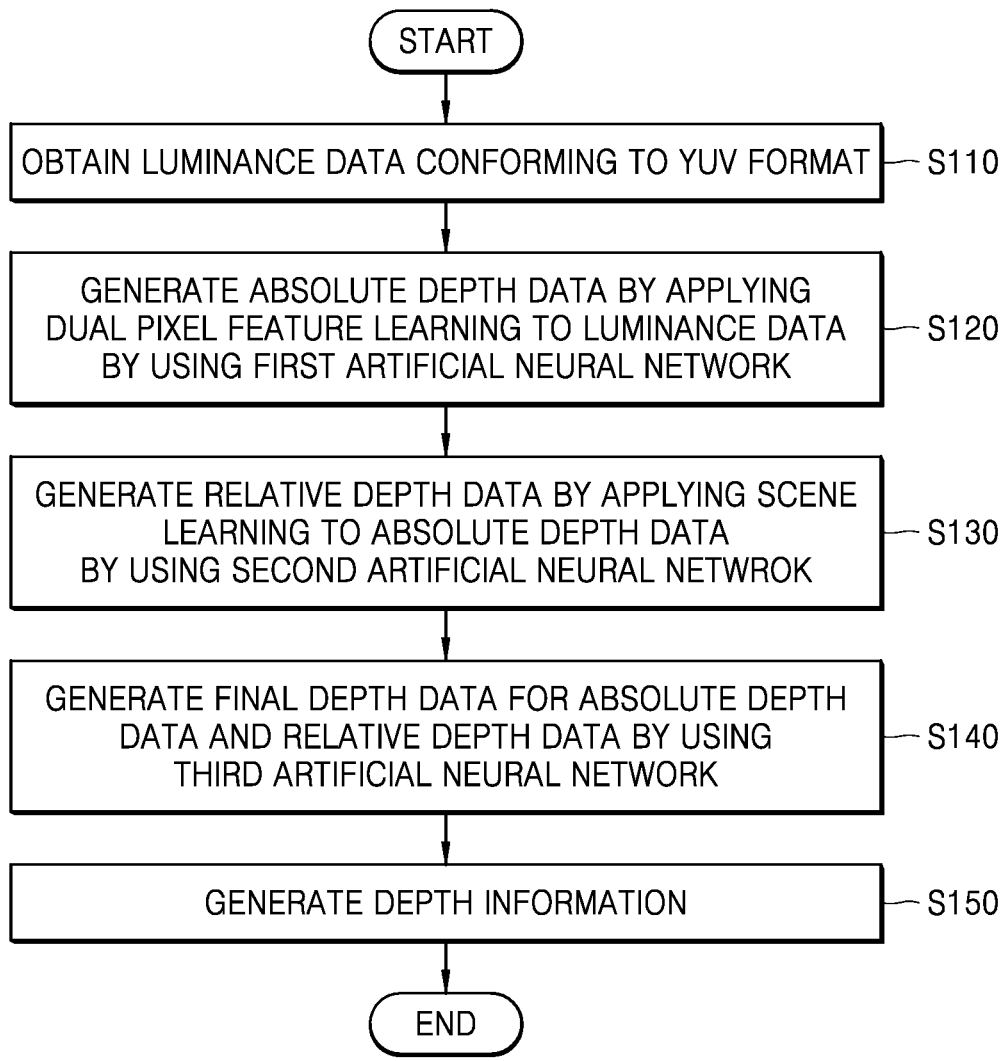
FIG. 2 is a flowchart illustrating a method of generating depth information according to an example embodiment of the inventive concept.

FIG. 2 is a flowchart illustrating a method of generating depth information, according to an example embodiment of the inventive concept. The method of generating depth information may be performed by the processing circuit 300 (FIG. 1), or the electronic device 10 (FIG. 1) including the processing circuit 300. FIG. 1 will be referred to together with FIG. 2.

In operation S110, the luminance data YDAT (FIG. 1) conforming to the YUV format may be obtained. For example, the processing circuit 300 may obtain the luminance data YDAT stored in the memory 400 (FIG. 1). The luminance data YDAT may be understood as data included in a luminance channel among image data expressed in the YUV format.

In operation S120, absolute depth data may be generated by applying dual pixel feature learning to the luminance data YDAT by using a first artificial neural network. For example, by inputting the obtained luminance data YDAT to the DFE 310, the processing circuit 300 may estimate an absolute depth as a result of processing image data sensed by a dual pixel, thereby generating the absolute depth data. The image data sensed by the dual pixel may have disparity. The dual pixel refers to two photoelectric conversion elements that share one microlens, and may have a small disparity compared to a dual camera, which refers to camera modules that are different from each other. Accordingly, features due to the dual pixel may be different from features due to the dual camera.

In operation S130, relative depth data may be generated by applying scene learning to the absolute depth data by using a second artificial neural network. For example, the absolute depth data output from the DFE 310 may be provided to the S.NET module 330, and the S.NET module 330 may estimate a relative depth according to processing by a scene network S.NET corresponding to the second artificial neural network, thereby generating the relative depth data.

In operation S140, final depth data for the absolute depth data and the relative depth data may be generated by using a third artificial neural network. For example, the relative depth data output from the S.NET module 330 may be provided to the D.NET module 350, and the D.NET module 350 may generate the final depth data according to processing by a disparity network D.NET corresponding to the third artificial neural network.

In operation S150, depth information may be generated. The depth information may be generated as a result of processing of the final depth data by a post-processing layer including a convolution layer, a batch normalization layer, and an activation layer.

Figure 3:
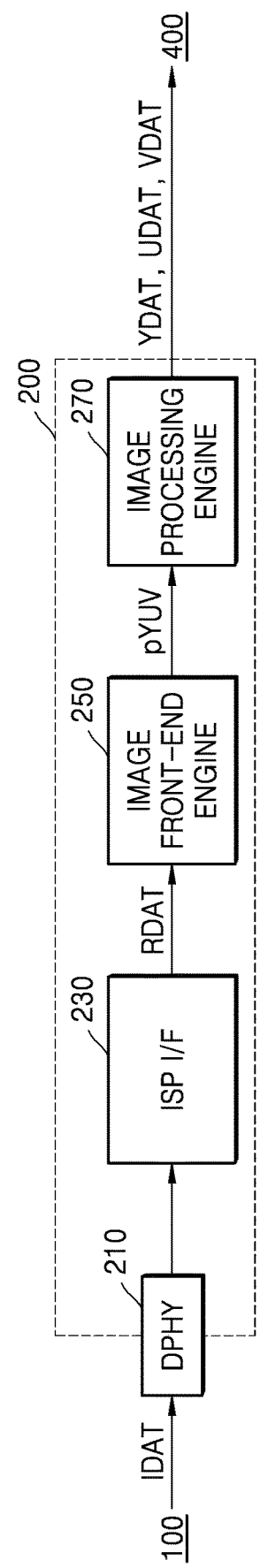
FIG. 3 is a block diagram specifically illustrating an image signal processor.

FIG. 3 is a block diagram specifically illustrating the ISP 200.

Referring to FIG. 3, the ISP 200 may include a DPHY 210, an ISP interface (ISP I/F) 230, an image front-end engine (IFE) 250, and an image processing engine (IPE) 270.

The DPHY 210, which is a physical layer for an interface between the image sensor 100 and a display, is a standardized interface established by the Mobile Industry Processor Interface (MIPI) Alliance. The DPHY 210 may transmit image data IDAT to the ISP 200. The image data IDAT may be provided from the image sensor 100 to the ISP 200. In this case, the ISP 200 may be referred to as a camera sub-system, and particularly, may conform to Camera Serial Interface-2 (MIPI-CSI-2) defined by the MIPI Alliance.

The ISP I/F 230 may route a data stream from a plurality of camera serial interface (CSI) decoders. The ISP I/F 230 may route raw data RDAT provided through the DPHY 210 to the IFE 250.

The IFE 250 may include hardware, firmware, and software configured to receive the raw data RDAT and output pre-YUV data pYUV. According to an example embodiment, the IFE 250 may perform an image processing operation such as collecting statistics of auto exposure (AE) noise, auto focus (AF) noise, and auto white balance (AWB) noise. In addition, the IFE 250 may perform various image processing operations such as defective pixel correction, offset correction, lens distortion correction, color gain correction, green imbalance correction, and the like.

The IPE 270 may include a CPU, a microprocessor, or a microcontroller unit (MCU). The IPE 270 may perform image post-processing with respect to input data. The post-processing may refer to a series of subsequent processing tasks for reducing errors and distortions, based on sensed image data. The post-processing performed by the IPE 270 may refer to application of an image enhancement algorithm with respect to image artifacts.

In an example embodiment, data processed by the IPE 270 may be stored in the memory 400. For example, the luminance data YDAT and the chrominance data pieces UDAT and VDAT, each having a changed data format with respect to the pre-YUV data pYUV, may be stored in the memory 400. In addition, an image-processed frame (hereinafter, referred to as converted image data) and/or result data (statistical data, a histogram, or the like) generated according to image processing may be stored in the memory 400.

Figure 4A:
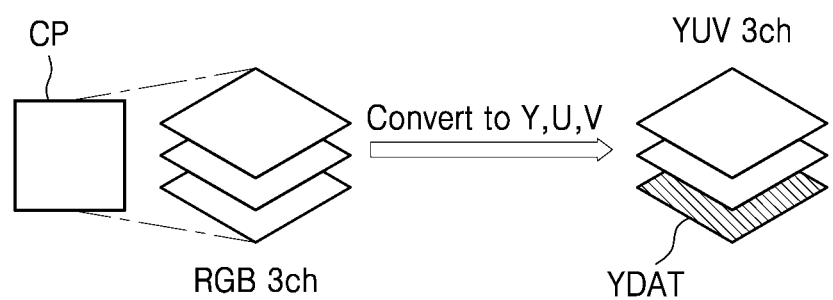
FIGS. 4A and 4B are diagrams illustrating a conversion relationship between an RGB format and a YUV format of image data.

FIGS. 4A and AB are diagrams illustrating a conversion relationship between the RGB format and the YUV format of image data. FIG. 1 will be referred to together with FIGS. 4A and 4B.

Referring to FIG. 4A, a color pixel CP may include red, green, and blue channels RGB 3ch. The ISP 200 may convert the red, green, and blue channels RGB 3ch into Y, U, and V channels YUV 3ch through color space conversion. In this regard, the luminance data YDAT is data corresponding to a channel representing a luminance signal. The U channel is a channel representing a difference between the luminance signal and a blue component, and is also referred to as a blue chrominance Cb channel. The V channel is a channel representing a difference between the luminance signal and a red component, and is also referred to as a red chrominance Cr channel. The electronic device 10 may input the luminance data YDAT, which is data for the Y channel among the converted Y, U, and V channels YUV 3ch, to an artificial neural network.

Figure 4B:
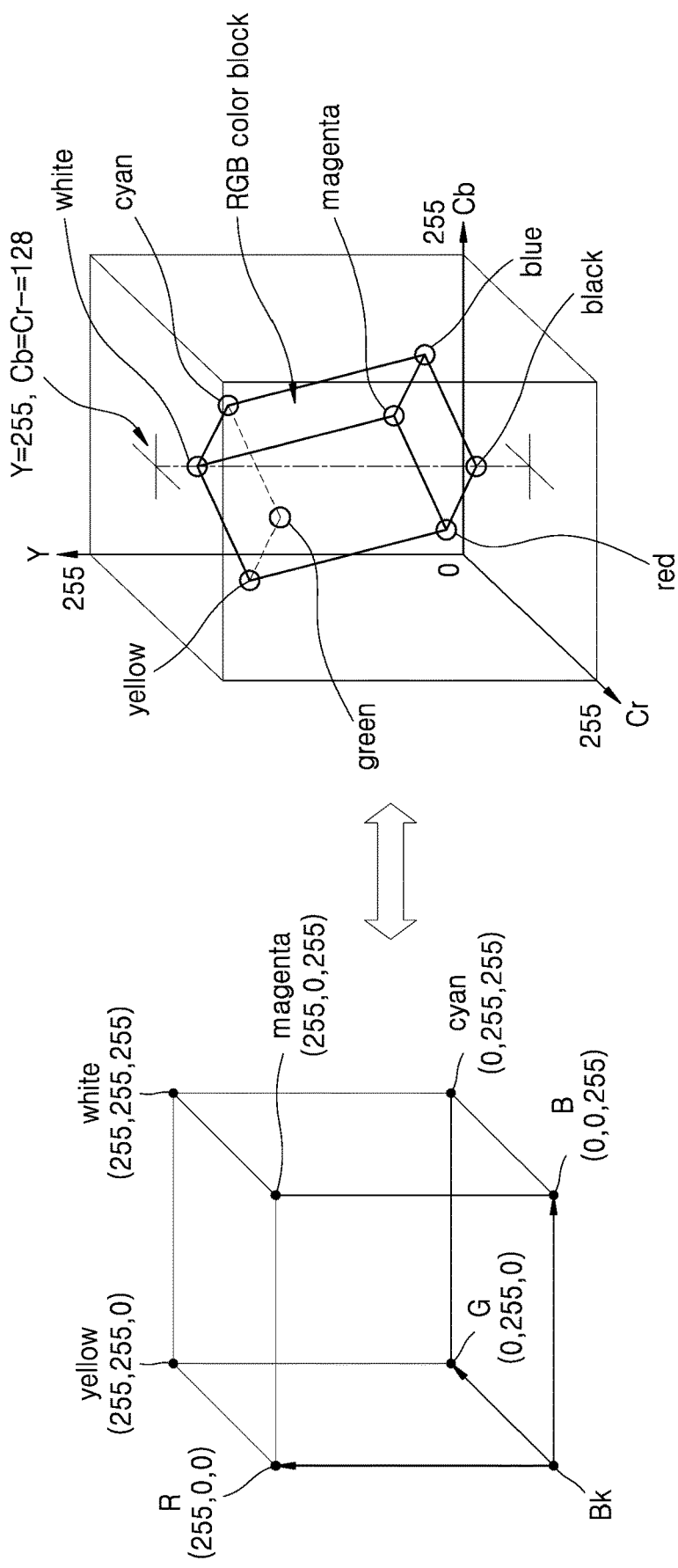

Referring to FIG. 4B, a conversion relationship between an RGB color space and a YUV color space is described.

In the RGB color space, red R, blue B, and green G constitute a dimension, and an origin thereof is black Bk. When data is expressed in 8 bits, red may represent (255, 0, 0), blue may represent (0, 0, 255), and green may represent (0, 255, 0). In this case, yellow may be expressed as (255, 255, 0), magenta may be expressed as (255, 0, 255), and cyan may be expressed as (0, 255, 255).

The RGB color space may be converted into the YUV color space through the following equations.

$$Y=(0.257 \times R)+(0.504 \times G)+(0.098 \times B)+16 \quad \text{[Equation 1]}$$

$$U=-(0.148 \times R)-(0.291 \times G)+(0.439 \times B)+128 \quad \text{[Equation 2]}$$

$$V=(0.439 \times R)-(0.368 \times G)-(0.071 \times B)+128 \quad \text{[Equation 3]}$$

When the RGB color space is converted into the YUV color space through Equations 1 to 3, positional relationships of red, blue, green, yellow, magenta, cyan, and white in the RGB color space change.

In the YUV color space, luminance Y, blue chrominance Cb (that is, a U channel), and red chrominance Cr (that is, a V channel) constitute a dimension. When data is expressed in 8 bits, red, blue, green, yellow, magenta, cyan, white, and black of the RGB color space may be expressed as edges of an octahedron, but may not be standardized into specific positions. For example, white is a color having the luminance Y of 255, and both the blue chrominance Cb and the red chrominance Cr of 128.

FIGS. 5A to 5D are diagrams illustrating data structures of image data IDAT conforming to the YUV format. The image data IDAT in the YUV format may be stored with a luminance component LUMA thereof and a chrominance component CHROMA thereof separated for each pixel to display a color image. The YUV format is also referred to as a YCbCr format. In FIGS. 5A to 5D, for convenience of explanation, the data structures will be described with the YCbCr format as an example.

Figure 5A:
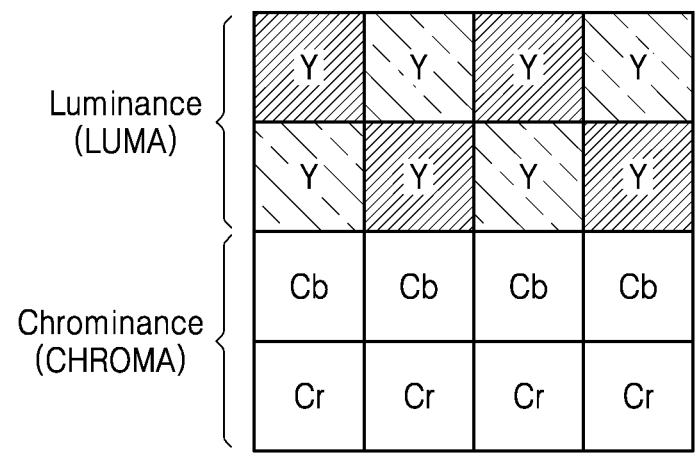
FIGS. 5A to 5D are diagrams illustrating a data structure of image data conforming to a YUV format.

Referring to FIG. 5A, a data structure having a YCbCr sampling ratio of 4:4:4 is shown. YCbCr 4:4:4 means that the ratio of Cr and Cb to Y is equally 4:4:4. When the data structure is read in a perpendicular direction from the luminance component LUMA, while four data spaces are provided in a row for the luminance component LUMA, in the chrominance component CHROMA, four data spaces for the blue chrominance Cb and four data spaces for the red chrominance Cr are provided.

Figure 5B:
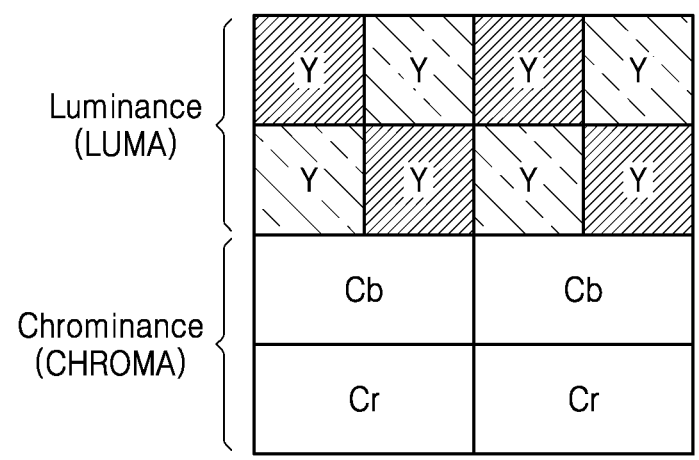

Referring to FIG. 5B, a data structure having a YCbCr sampling ratio of to 4:2:2 is shown. When the data structure is read in a perpendicular direction from the luminance component LUMA, while four data spaces are provided in a row for the luminance component LUMA, in the chrominance component CHROMA, two data spaces for the blue chrominance Cb and two data spaces for the red chrominance Cr are provided. Thus, YCbCr 4:2:2 means that the ratio of Cr and Cb to Y is 4:2:2.

Figure 5C:
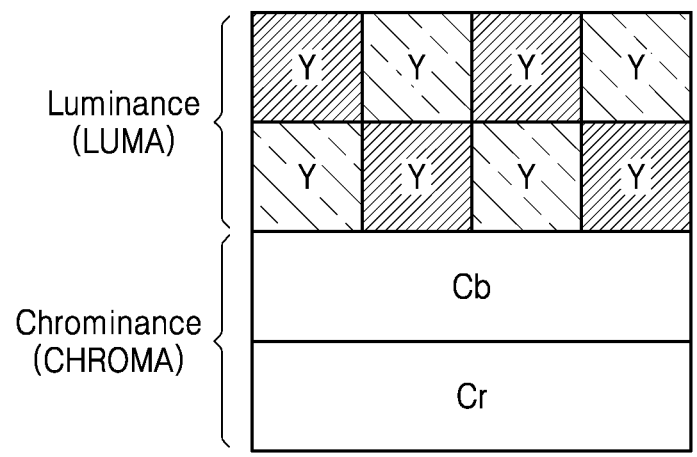

Referring to FIG. 5C, a data structure having a YCbCr sampling ratio of to 4:1:1 is shown. When the data structure is read in a perpendicular direction from the luminance component LUMA, while four data spaces are provided in a row for the luminance component LUMA, in the chrominance component CHROMA, one data space for the blue chrominance Cb and one data space for the red chrominance Cr are provided. Thus, YCbCr 4:1:1 means that the ratio of Cr and Cb to Y is 4:1:1.

Figure 5D:
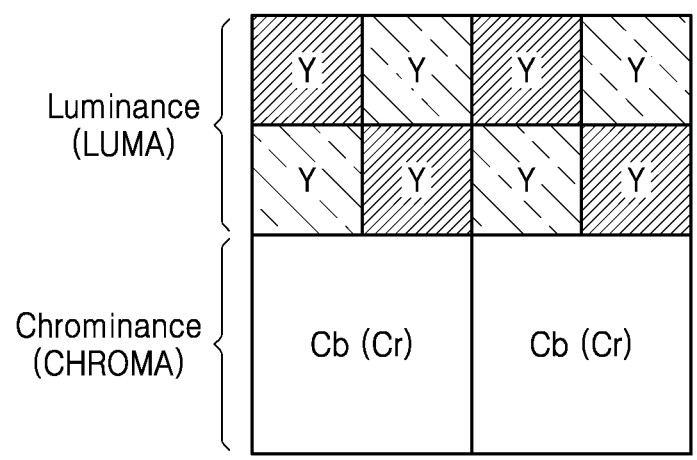

Referring to FIG. 5D, a data structure having a YCbCr sampling ratio of to 4:2:0 is shown. When the data structure is read in a perpendicular direction from the luminance component LUMA, while four data spaces are provided in a row for the luminance component LUMA, in the chrominance component CHROMA, two data spaces for the blue chrominance Cb or the red chrominance Cr are provided. Thus, YCbCr 4:2:0 may mean that the ratio of Cr (or Cb) and Cb (or Cr) to Y is 4:2:0.

According to an example embodiment of the inventive concept, the ISP 230 (FIG. 3) may generate YUV data conforming to the format of YCbCr 4:2:0 with respect to the image data IDAT. YCbCr 4:2:0 may be efficient for data processing, storage, and/or display in portable electronic devices. However, the image data DAT is not limited thereto, and may have one of various YCbCr data structures as described above.

Figure 6A:
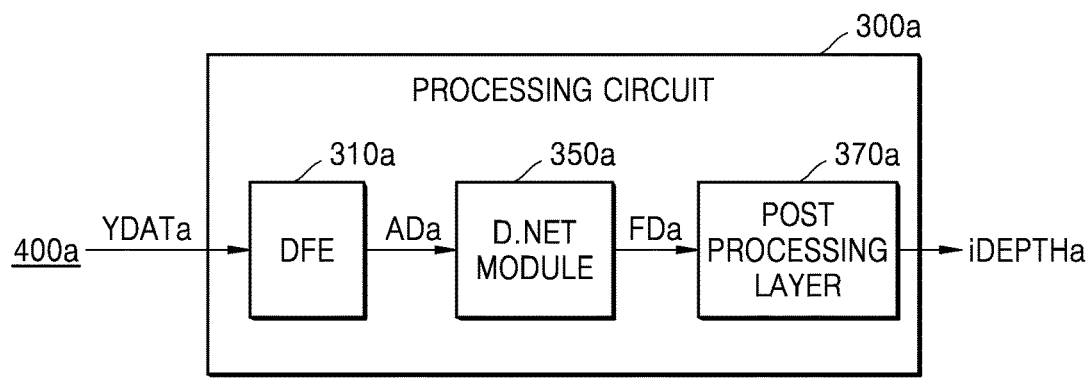
FIGS. 6A to 6C are block diagrams illustrating a processing circuit according to an example embodiment of the inventive concept.
Figure 6B:
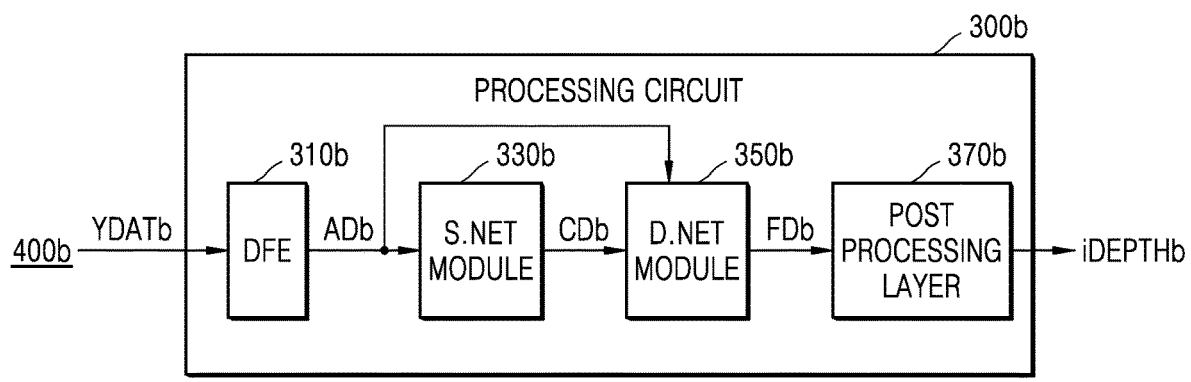
Figure 6C:
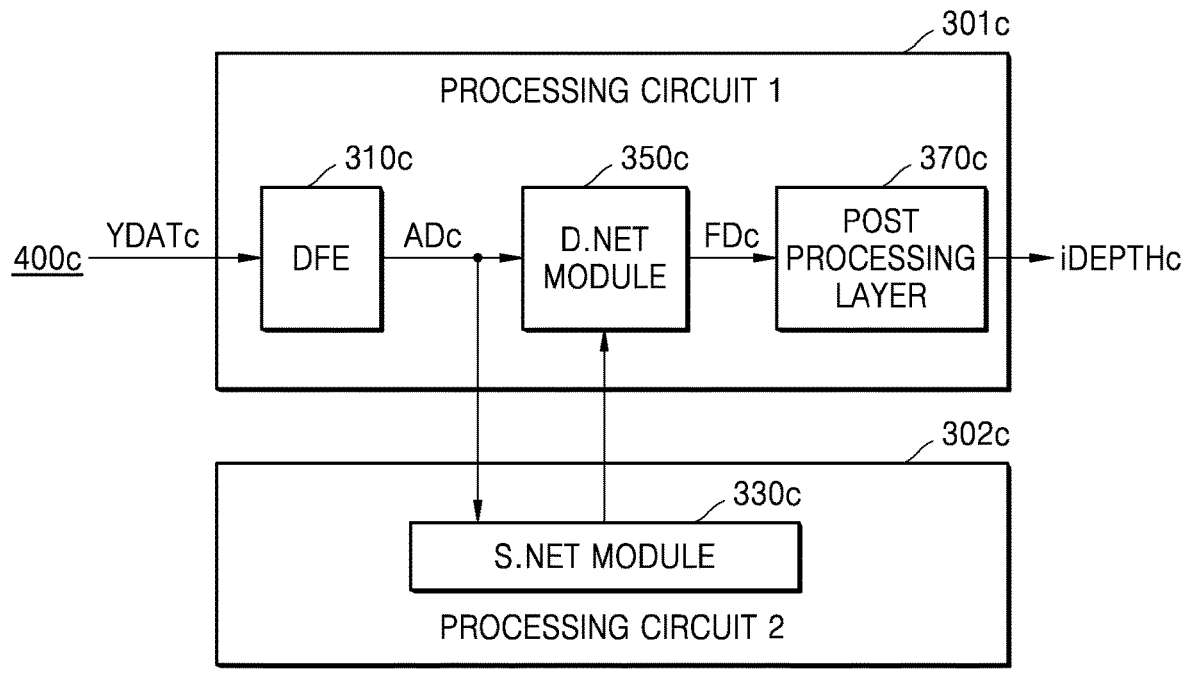

FIGS. 6A to 6C are block diagrams illustrating processing circuits 300a and 300b and first and second processing circuits 301c and 302c according to an example embodiment of the inventive concept.

Referring to FIG. 6A, the processing circuit 300a may generate depth information iDEPTHa by processing luminance data YDATa. According to an example embodiment, the processing circuit 300a may include a DFE 310a, a D.NET module 350a, and a post-processing layer 370a.

An absolute depth of the luminance data YDATa may be estimated by inputting the luminance data YDATa to the DFE 310a, and as a result, absolute depth data ADa may be generated. A disparity network D.NET supported by the D.NET module 350a may include an activation layer and a plurality of convolution layers, the activation layer including at least one ReLU function, and may generate final depth data FDa by processing the absolute depth data ADa. The post-processing layer 370a may process the final depth data FDa into the depth information iDEPTHa.

According to an example embodiment of the inventive concept, by using only the luminance data YDATa, the processing circuit 300a may generate depth information that is more robust to a low-illuminance environment than image data conforming to the RGB format.

In addition, according to an example embodiment of the inventive concept, by training an artificial neural network with only the luminance data YDATa among YUV data (for example, the luminance data YDAT and the chrominance data pieces UDAT and VDAT of FIG. 3), the processing circuit 300a may reduce memory usage and power consumption. In addition, because the processing circuit 300a according to an example embodiment of the inventive concept does not need to convert data that has already been converted to the YUV format back to the RGB format, data processing speed may be improved.

Referring to FIG. 6B, the processing circuit 300b may generate depth information iDEPTHb by processing luminance data YDATb. According to an example embodiment, the processing circuit 300b may include a DFE 310b, an S.NET module 330b, a D.NET module 350b, and a post-processing layer 370b.

An absolute depth of the luminance data YDATb may be estimated by inputting the luminance data YDATb to the DFE 310b, and as a result, absolute depth data ADb may be generated. The S.NET module 330b may estimate a relative depth of the absolute depth data ADb by using a scene network S.NET. A relative depth estimation result for the absolute depth data ADb may be output as relative depth data CDb. A disparity network D.NET supported by the D.NET module 350b may generate final depth data FDb by fusing the absolute depth data ADb with the relative depth data CDb. The post-processing layer 370b may process the final depth data FDb into the depth information iDEPTHb.

Because the processing circuit 300b according to an example embodiment of the inventive concept may estimate a depth considering a relative depth even for data having small disparity (for example, the luminance data YDATb), the accuracy of depth estimation may be improved.

Referring to FIG. 6C, the first processing circuit 301c may generate depth information iDEPTHc by processing luminance data YDATc. According to an example embodiment, the first processing circuit 301c may include a DFE 310c, a D.NET module 350c, and a post-processing layer 370c, and the second processing circuit 302c may include an S.NET module 330c.

An absolute depth of the luminance data YDATc may be estimated by inputting the luminance data YDATc to the DFE 310c, and as a result, absolute depth data ADc may be generated. The absolute depth data ADc may be provided to the S.NET module 330c and the D.NET module 350c.

The S.NET module 330c of the second processing circuit 302c may estimate a relative depth of the absolute depth data ADc by using a scene network S.NET. A relative depth estimation result for the absolute depth data ADc may be output to the first processing circuit 301c as relative depth data CDc. A disparity network D.NET supported by the D.NET module 350c may generate final depth data FDc by fusing the absolute depth data ADc with the relative depth data CDc received from the second processing circuit 302c. The post-processing layer 370c may process the final depth data FDc into the depth information iDEPTHc.

Because a portion of the artificial neural network is processed in another processing circuit (for example, the second processing circuit 302c), the first processing circuit 301c according to an example embodiment of the inventive concept may promote distributed processing of data, and may accomplish distributed and/or parallel processing of tasks that have a large data size or require a long data processing time.

Figure 7A:
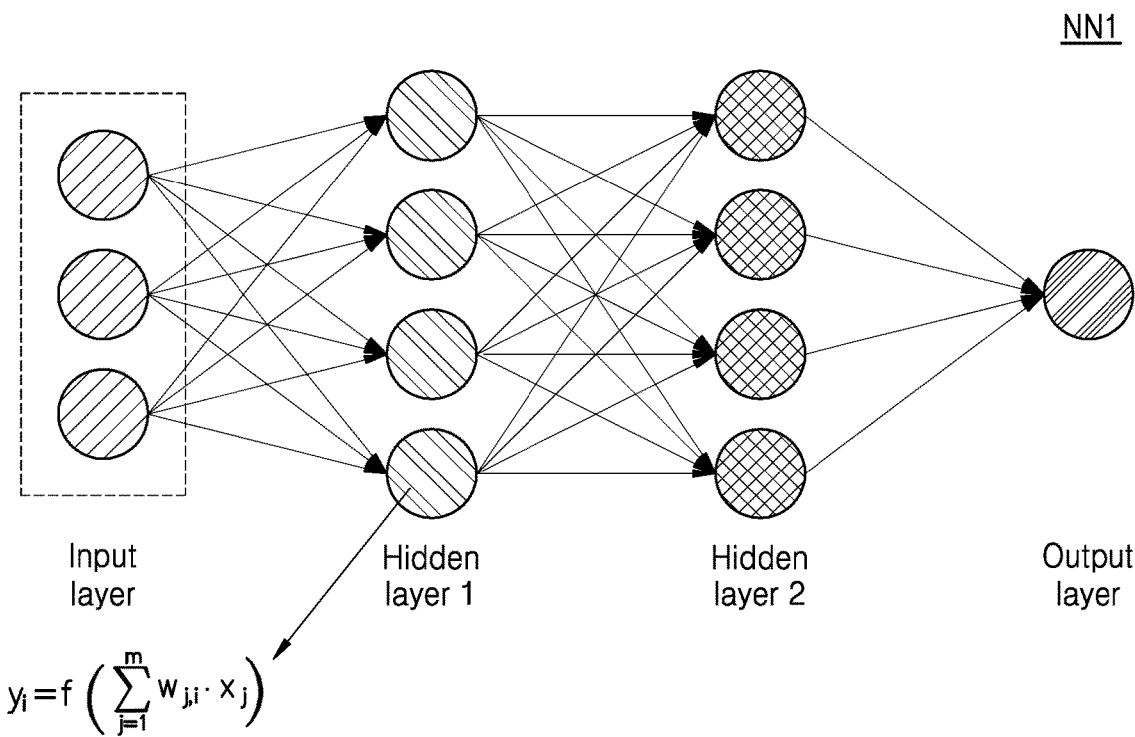
FIGS. 7A to 7C are diagrams illustrating a structure and an operation of an artificial neural network.
Figure 7B:
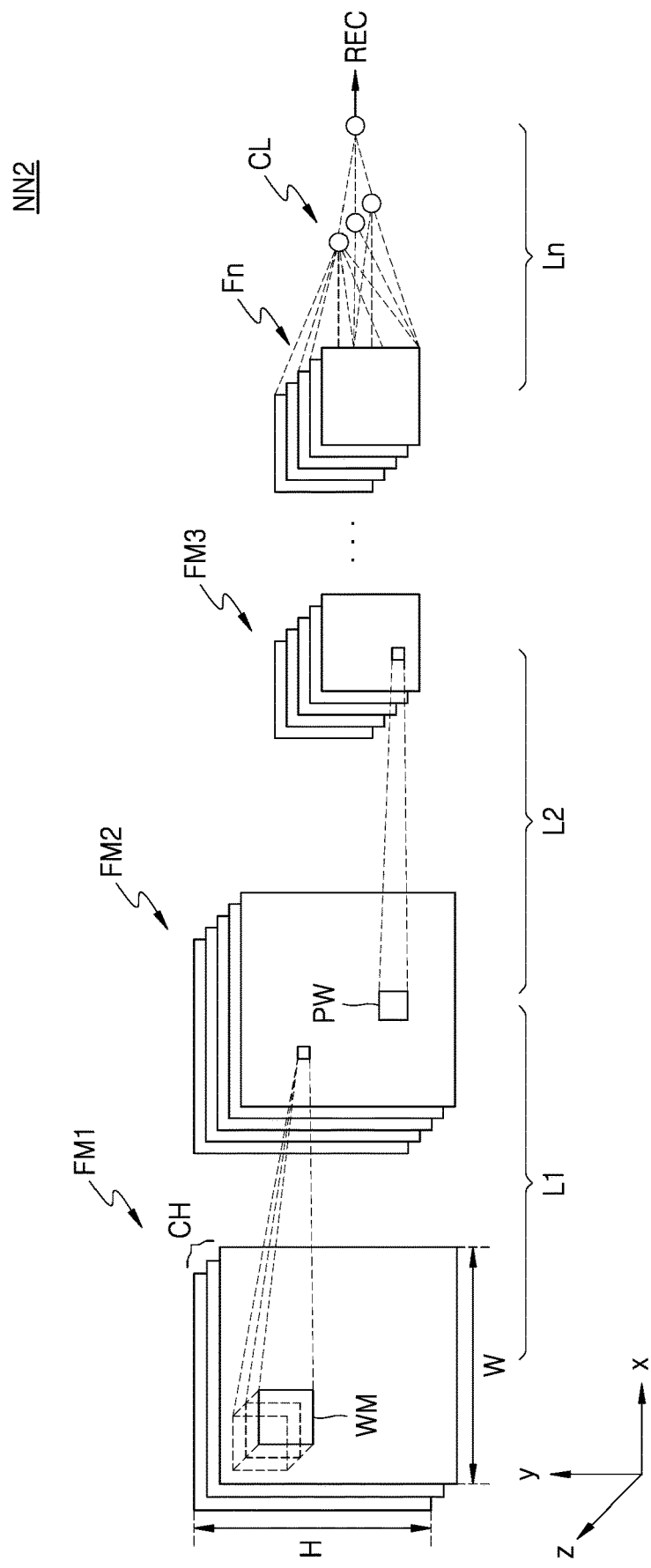
Figure 7C:
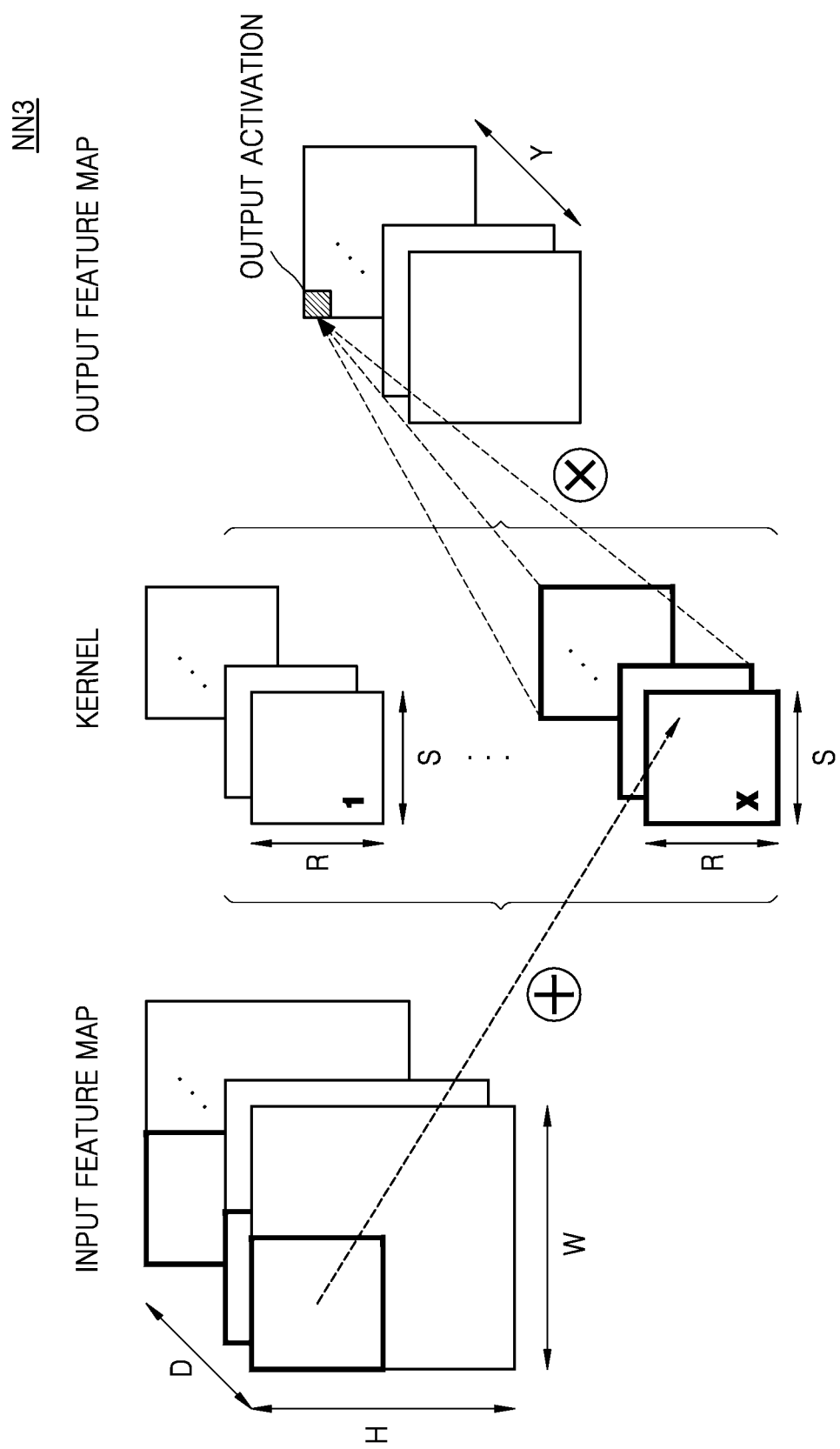

FIGS. 7A to 7C are diagrams illustrating structures and operations of artificial neural networks NN1, NN2, and NN3.

Referring to FIG. 7A, the artificial neural network NN1 may be a CNN, but is not limited thereto. Although FIG. 7A illustrates, for convenience of explanation, that the artificial neural network NN1 includes two hidden layers, the artificial neural network NN1 is not limited thereto and may include various numbers of hidden layers. In addition, although FIG. 7A illustrates that the artificial neural network NN1 includes a separate input layer for receiving input data, in some embodiments, the input data may be directly input to the hidden layers.

In the artificial neural network NN1, nodes of layers other than an output layer may be connected to nodes of a next layer through links for transmitting an output signal. Through these links, values obtained by multiplying node values of nodes included in a previous layer by a weight assigned to each link may be input to one node. The node values of the previous layer may correspond to axon values, and the weight may correspond to a synaptic weight. The weight may be referred to as a parameter of the artificial neural network NN1.

An activation function may be applied to convert values of feature maps into nonlinear information on whether or not a feature is present. For example, the activation function may include a Sigmoid function, a hyperbolic tangent (tanh) function, a ReLU function, or the like, and nonlinearity may be implemented in the artificial neural network NN1 by the activation function.

An output of any one node included in the artificial neural network NN1 may be represented by the following Equation 4.

$$y_i = f\left(\sum_{j=1}^{m} w_{j,i} x_j\right) \quad \text{[Equation 4]}$$

Equation 4 may represent an output value yi of an i-th node with respect to m input values in a layer. xj may represent an output value of a j-th node of a previous layer, and wj,i may represent a weight applied to a connecting portion between the j-th node of the previous layer and the i-th node of the current layer. f( ) may represent an activation function. As shown in Equation 1, in the activation function, a cumulative result of multiplying an input value xj by a weight wj,i may be used. In other words, at each node, an operation in which the input value xj is multiplied by the weight wj,i and results thereof are accumulated, for example, a multiply-accumulate (MAC) operation, may be performed. In addition to such usage, there may be various applications that require an MAC operation, and a processing device capable of processing the MAC operation in an analog circuit region may be used.

Referring to FIG. 7B, the artificial neural network NN2 may include a plurality of layers, that is, first to n-th layers L1 to Ln. Each of the first to n-th layers L1 to Ln may be a linear layer or a nonlinear layer. In an embodiment, at least one linear layer and at least one nonlinear layer may be combined with each other and be referred to as one layer. For example, the linear layer may include a convolution layer and a fully connected layer, and the nonlinear layer may include a pooling layer and an activation layer.

For example, the first layer L1 may be the convolution layer, the second layer L2 may be the pooling layer, and the n-th layer Ln as an output layer may be the fully connected layer. The artificial neural network NN2 may further include the activation layer or a layer performing another kind of operation.

Each of the first to n-th layers L1 to Ln may receive input data (for example, an image frame) or a feature map generated by a previous layer as an input feature map, and may generate an output feature map or a recognition signal REC by operating the input feature map. In this case, the feature map refers to data in which various features of the input data are expressed. First to n-th feature maps FM1, FM2, FM3, . . . , and FMn may have, for example, a two-dimensional matrix form or a three-dimensional matrix (or tensor) form. The first to n-th feature maps FM1, FM2, FM3, . . . , and FMn may have a width W (or a column), a height H (or a row), and a depth D, which may respectively correspond to an x-axis, a y-axis, and a z-axis on coordinates. In this case, the depth D may be referred to as the number of channels.

The first layer L1 may generate the second feature map FM2 by convolving the first feature map FM1 with a weight map WM. The weight map WM may filter the first feature map FM1, and may be referred to as a filter or a kernel. A depth, that is, the number of channels, of the weight map WM is equal to the depth, that is, the number of channels, of the first feature map FM1, and the same channels of the weight map WM and the first feature map FM1 may be convolved with each other. The weight map WM may be shifted by a method of traversing using the first feature map FM1 as a sliding window. An amount shifted may be referred to as a "stride length" or a "stride". During each shift, each of weight values included in the weight map WM may be multiplied by and added to all cell data pieces in a region in which each of the weight values included in the weight map WM overlaps with the first feature map FM1. Data pieces of the first feature map FM1 in a region in which each of the weight values included in the weight map WM overlaps with the first feature map FM1 may be referred to as extraction data. As the first feature map FM1 is convolved with the weight map WM, one channel of the second feature map FM2 may be generated. Although one weight map WM is shown in FIG. 7B, a plurality of weight maps may substantially be convolved with the first feature map FM1 to generate a plurality of channels of the second feature map FM2. For example, the number of channels of the second feature map FM2 may correspond to the number of weight maps.

The second layer L2 may generate the third feature map FM3 by changing a spatial size of the second feature map FM2 through pooling. The pooling may be referred to as sampling or down-sampling. A two-dimensional pooling window PW may be shifted on the second feature map FM2 in units of a size of the pooling window PW, and a maximum value (or an average value) of cell data pieces in a region in which the second feature map FM2 overlaps with the pooling window PW may be selected. Accordingly, the third feature map FM3 having a changed spatial size may be generated from the second feature map FM2. The number of channels of the third feature map FM3 is equal to the number of channels of the second feature map FM2.

The n-th layer Ln may classify a class CL of the input data by combining features of the n-th feature map FMn. In addition, the n-th layer Ln may generate the recognition signal REC corresponding to the class CL. In an embodiment, the input data may correspond to frame data included in a video stream, and the n-th layer Ln may extract the class CL corresponding to an object included in an image expressed by the frame data, based on the n-th feature map FMn provided from the previous layer, to thereby recognize the object and generate the recognition signal REC corresponding to the recognized object.

Referring to FIG. 7C, input feature maps may include D channels, and the input feature map of each channel may have a size of H row by W column (wherein, D, H, and W are natural numbers). Each of kernels may have a size of R row by S column, and the kernels may include channels in a number corresponding to the number of channels (or the depth) of the input feature maps 201 (wherein, R and S are natural numbers). Output feature maps may be generated through a three-dimensional convolutional operation between the input feature maps and the kernels, and may include Y channels according to the convolutional operation.

Figure 8:
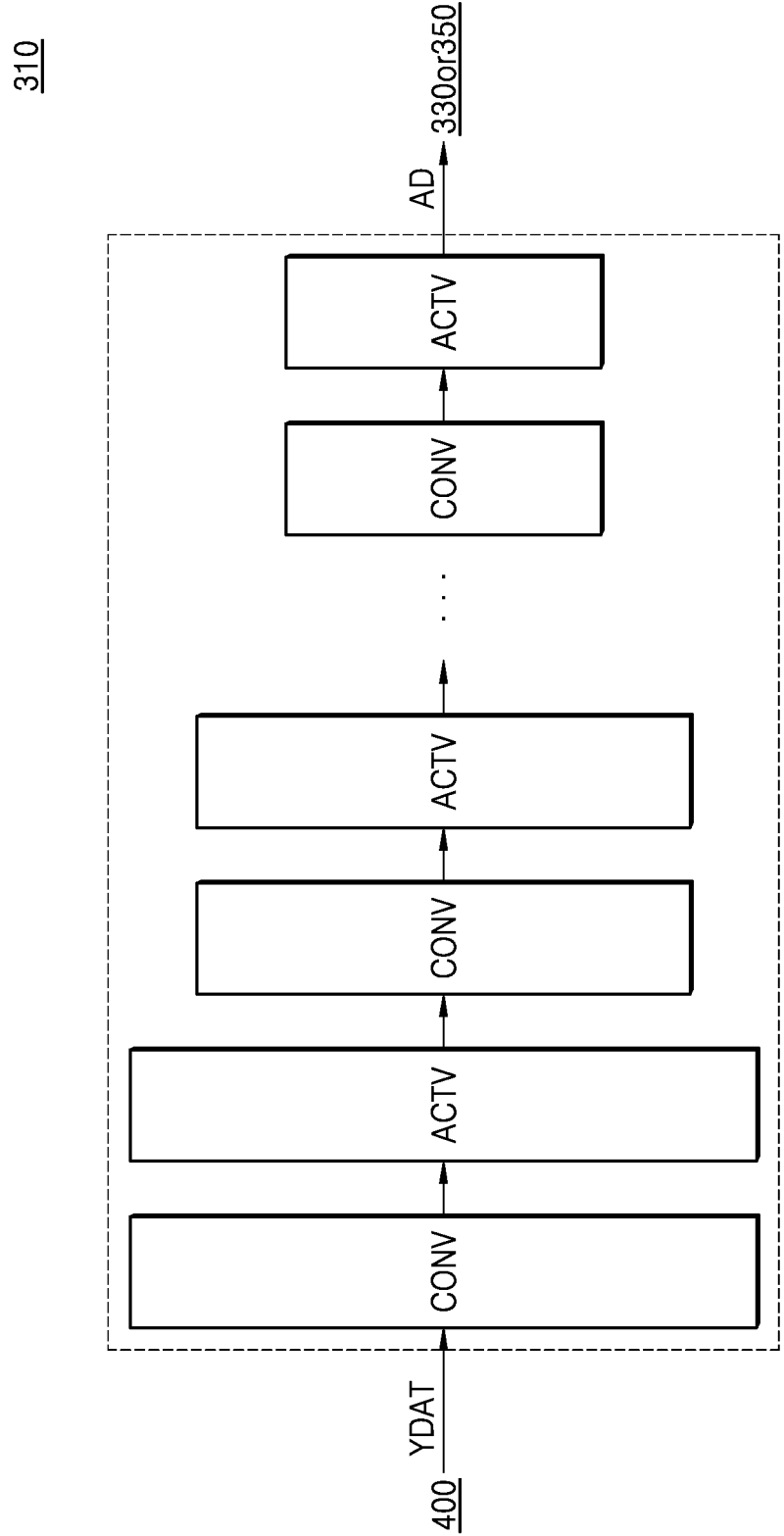
FIG. 8 is a block diagram illustrating a structure of a disparity feature extractor according to an example embodiment of the inventive concept.

FIG. 8 is a block diagram illustrating a structure of the DFE 310 according to an example embodiment of the inventive concept.

Referring to FIG. 8, the DFE 310 may include a plurality of stages, and one stage may be composed of a pair of a convolution layer CONV and an activation layer ACTV. The activation layer ACTV is a nonlinear layer to which at least one of a Sigmoid function, a tanh function, or a ReLU function is applied to convert the existence of a feature into nonlinear information.

According to an example embodiment of the inventive concept, the DFE 310 may receive luminance data YDAT from the memory 400, and may input the luminance data YDAT to the convolutional layer CONV of the first stage to refine and process the data. The DFE 310 may generate absolute depth data AD as a result. The absolute depth data AD may be provided to the S.NET module 330 or the D.NET module 350.

Figure 9:
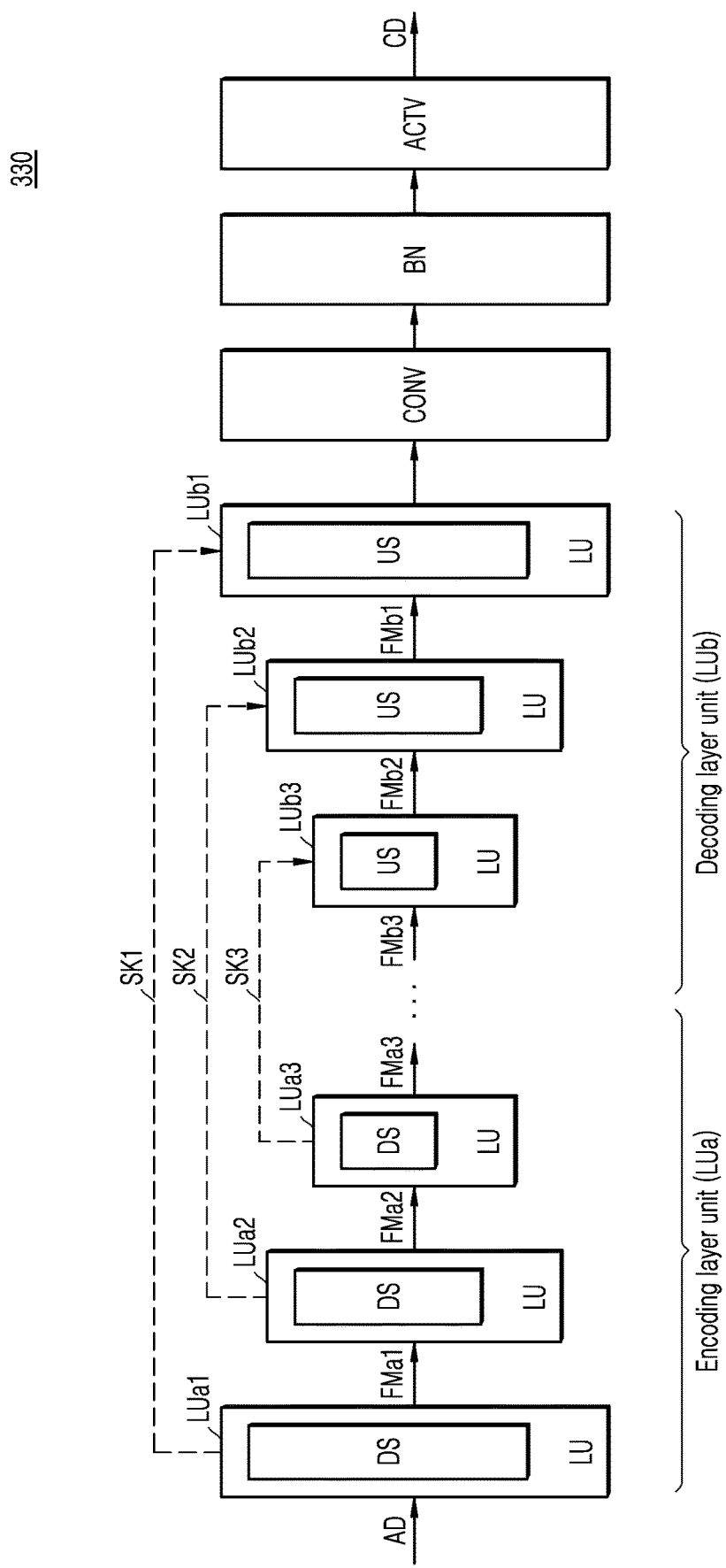
FIG. 9 is a block diagram illustrating a structure of a scene network module according to an example embodiment of the inventive concept.

FIG. 9 is a block diagram illustrating a structure of the S.NET module 330 according to an example embodiment of the inventive concept.

Referring to FIG. 9, a scene network S.NET used in the S.NET module 330 may include an encoding layer unit LUa, and a decoding layer unit LUb. The scene network S.NET may receive absolute depth data AD, and a feature value of the absolute depth data AD may be calculated by the encoding layer unit LUa, the decoding layer unit LUb.

The scene network S.NET may include a plurality of encoders (encoding layer units) and a plurality of decoders (decoding layer units), and the plurality of encoders and the plurality of decoders may be implemented in a symmetrical pyramid structure. For example, the plurality of encoders may be connected in series to gradually decrease a resolution of encoding data, and the plurality of decoders may be connected in series to gradually increase a resolution of decoding data.

The encoding layer unit LUa may receive a feature map output from a previous encoding layer unit, and may perform an operation assigned to each encoding layer unit (for example, LUa1). For example, a first encoding layer unit LUa1 may receive a feature map FMa0, and perform operations by various layers included in the first encoding layer unit LUa1. For example, the encoding layer unit LUa may include a convolution layer, a sampling layer, and an activation layer. The convolution layer may perform a convolutional operation. The sampling layer may perform a down-sampling, up-sampling, average pooling, or maximum pooling operation. The activation layer may perform an operation by a ReLU function or a Sigmoid function. The first encoding layer unit LUa1 may output a feature map FMa1 based on a result of the operation.

The feature map FMa1 output by the first encoding layer unit LUa1 may have a smaller width and height than the input feature map FMa0, and may have a large depth. For example, the first encoding layer LUa1 may control the width, height, and depth of the feature map FMa1. For example, the depth may be controlled so as not to be excessively large. The first encoding layer LUa1 may have a parameter for setting the depth of the feature map FMa1. Meanwhile, the first encoding layer unit LUa1 may include a down-sampling layer DS. The down-sampling layer DS may select predetermined feature values from among feature values included in the input feature map FMa0 and output the same as feature values of the feature map FMa1. For example, the down-sampling layer DS may control the width and height of the feature map FMa1. A second encoding layer unit LUa2 and a third encoding layer unit LUa3 may process an operation similarly to the first encoding layer unit LUa1. For example, the second encoding layer unit LUa2 and the third encoding layer unit LUa3 may receive a feature map from a previous encoding layer unit, process an operation by a plurality of layers included in the current layer unit, and output a feature map including a result of the operation to a next encoding layer unit.

The encoding layer unit LUa may output to the next encoding layer unit LUa or the decoding layer unit LUb of the same level. Each encoding layer unit LUa may be fixedly connected to a next encoding layer unit LUa, and may be connected to the decoding layer unit LUb of the same level via a plurality of skip connections, for example, first to third skip connections SK1 to SK3. Although only the first to third skip connections are shown in FIG. 9, the inventive concept is not limited thereto. The expression "the same level" may refer to, for example, a case in which an order from the input layer IL is equal to an order from the output layer OL. Layer units of the same level may be, for example, the first encoding layer unit LUa1 and a first decoding layer unit LUb1.

According to an example embodiment, at least some of the first to third skip connections SK0 to SK3 may be selected by the processing circuit 300 or the electronic device 10. For example, the processing circuit 300 may receive information on a skip level. When a skip level of an artificial neural network model is set, the first to third skip connections SK0 to SK3 corresponding to the preset skip level may be activated. For example, when the skip level of the artificial neural network model is 2, the first skip connection SK0 and the second skip connection SK1 may be activated. The encoding layer unit LUa may output a feature map to the decoding layer unit LUb via the active skip connections. Inactive skip connections (for example, SK2 and SK3) may not propagate a feature map.

According to an example embodiment of the inventive concept, layer units of the same level (for example, LUa1 and LUb1) may process feature maps of substantially the same size. For example, a size of the feature map FMa0 received by the first encoding layer unit LUa1 and a size of a feature map FMb0 output by the first decoding layer unit LUb1 may be substantially the same. For example, a size of a feature map may include at least one of a width, height, and depth. In addition, a size of the feature map FMa1 output by the first encoding layer unit LUa1 and a size of a feature map FMb1 received by the first decoding layer unit LUb1 may be substantially the same.

According to an example embodiment of the inventive concept, the encoding layer unit LUa and the decoding layer unit LUb of the same level may have substantially the same sampling size. For example, a down-sampling size of the first encoding layer unit LUa1 and an up-sampling size of the first decoding layer unit LUb1 may be substantially the same.

The decoding layer unit LUb may receive a feature map from a previous decoding layer unit LUb or receive a feature map from the encoding layer unit LUa of the same level. The decoding layer unit LUb may process an operation by using the received feature map. For example, the decoding layer unit LUb may include a convolution layer, a sampling layer, and an activation layer.

The feature map FMa1 output by the first encoding layer unit LUa1 may have a smaller width and height than the input feature map FMa0, and may have a large depth. For example, the first encoding layer LUa1 may control the width, height, and depth of the feature map FMa1. For example, the depth may be controlled so as not to be excessively large. The first encoding layer LUa1 may have a parameter for setting the depth of the feature map FMa1.

An up-sampling layer US may adjust a size of an input feature map. For example, the up-sampling layer US may adjust a width and height of the feature map. The up-sampling layer US may perform an up-sampling operation by using each of feature values of the input feature map and feature values adjacent to the each of the feature values. For example, the up-sampling layer US may be a layer that writes the same feature values into an output feature map by using a Nearest Neighbor method. As another example, the up-sampling layer US may be a transpose convolution layer, and may up-sample an image by using a predetermined weight map.

Data that has returned to a previous resolution by being up-sampled may be converted into relative depth data CD via a convolution layer CONV, a batch normalization layer BN, and an activation layer ACTV.

Figure 10:
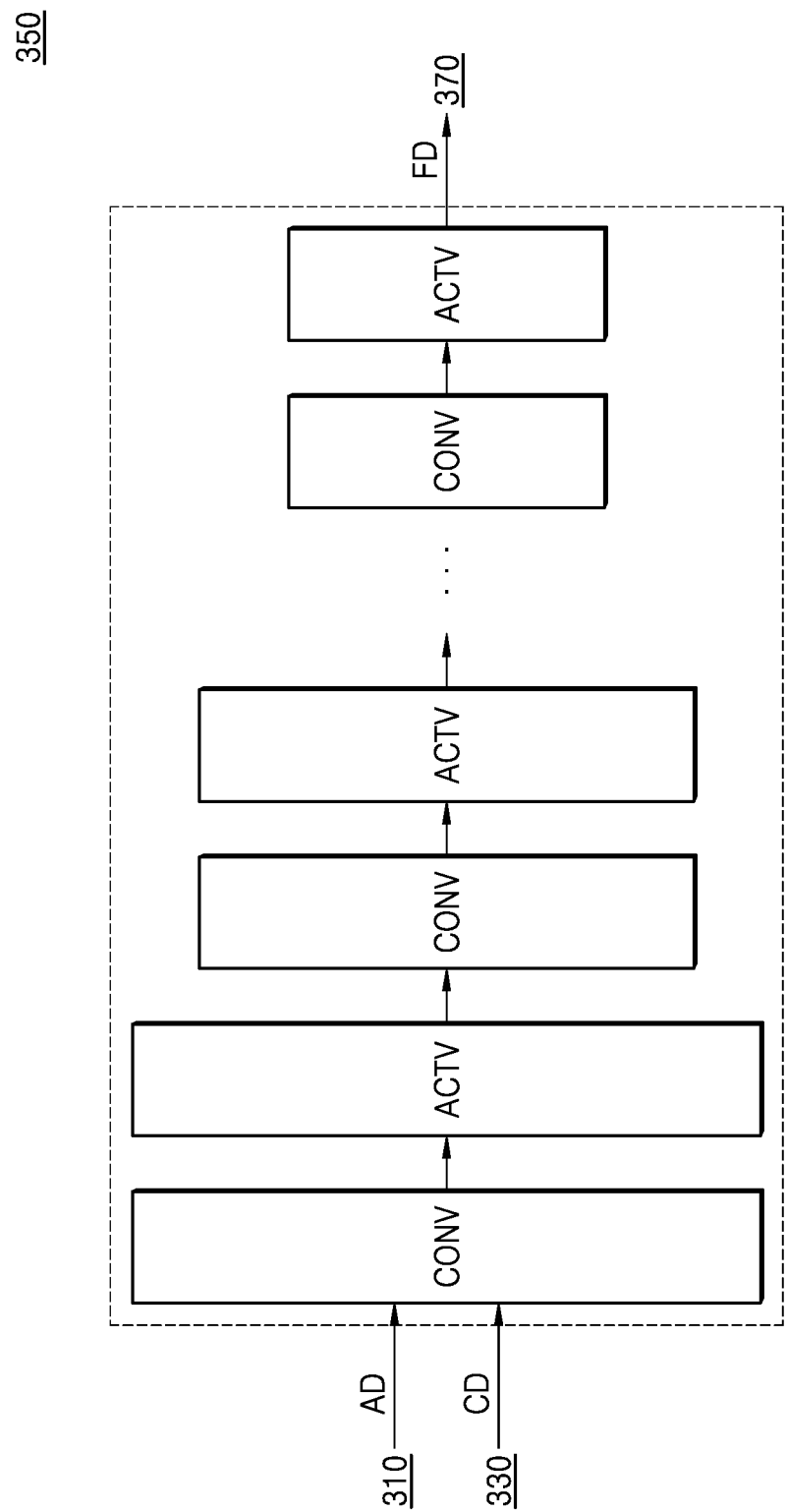
FIG. 10 is a block diagram illustrating a structure of a disparity network module according to an example embodiment of the inventive concept.

FIG. 10 is a block diagram illustrating a structure of the D.NET module 350 according to an example embodiment of the inventive concept.

Referring to FIG. 10, the D.NET module 350 may include a plurality of stages, and one stage may be composed of a pair of a convolution layer CONV and an activation layer ACTV.

According to an example embodiment of the inventive concept, the D.NET module 350 may receive absolute depth data AD from the DFE 310, and/or may receive relative depth data CD from the S.NET module 330.

The absolute depth data AD, or relative depth data CD fused with the absolute depth data AD may be input to the convolution layer CONV of a first stage. The D.NET module 350 may generate final depth data FD as a result. The final depth data FD may be transmitted to a post-processing layer 370.

Figure 11:
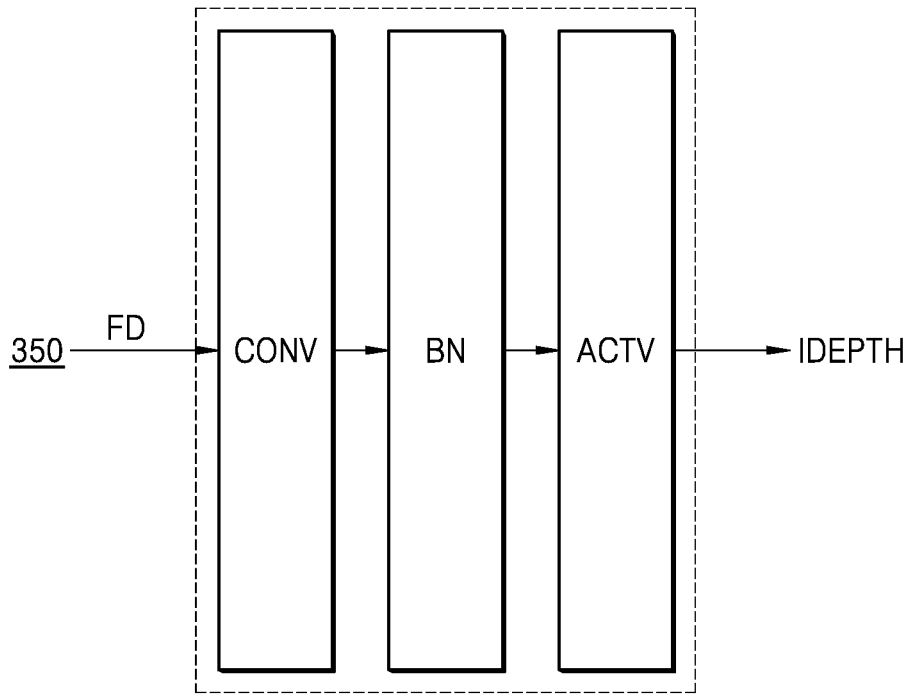
FIG. 11 is a block diagram illustrating a structure of a post-processing layer according to an example embodiment of the inventive concept.

FIG. 11 is a block diagram illustrating a structure of the post-processing layer 370 according to an example embodiment of the inventive concept.

According to an example embodiment, the post-processing layer 370 may include a convolution layer CONV, a batch normalization layer BN, and an activation layer ACTV. The post-processing layer 370 may convert the final depth data FD into depth information iDEPTH, for example, by performing known types of convolution, batch normalization, and activation functions, using the convolution layer CONV, the batch normalization layer BN, and the activation layer ACTV.

Figure 12A:
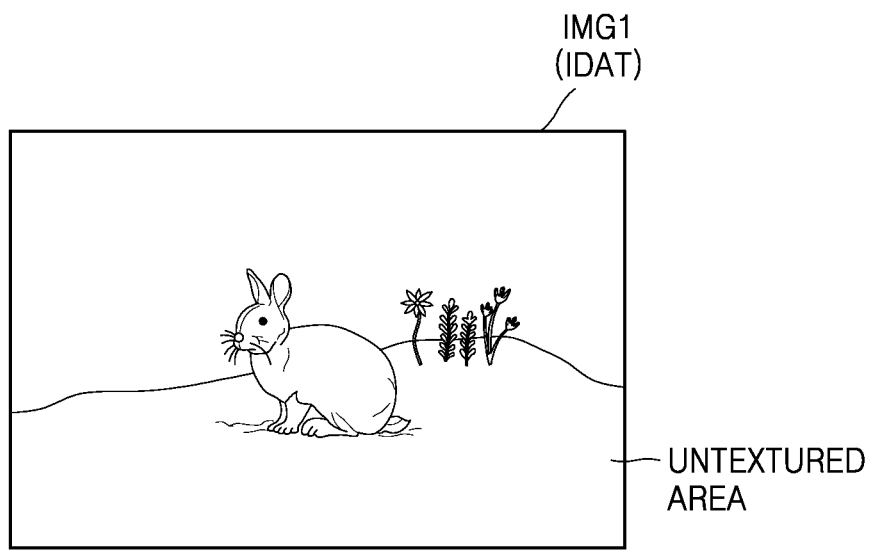
FIGS. 12A to 12C are diagrams illustrating a depth estimation result of image data according to an example embodiment of the inventive concept.
Figure 12B:
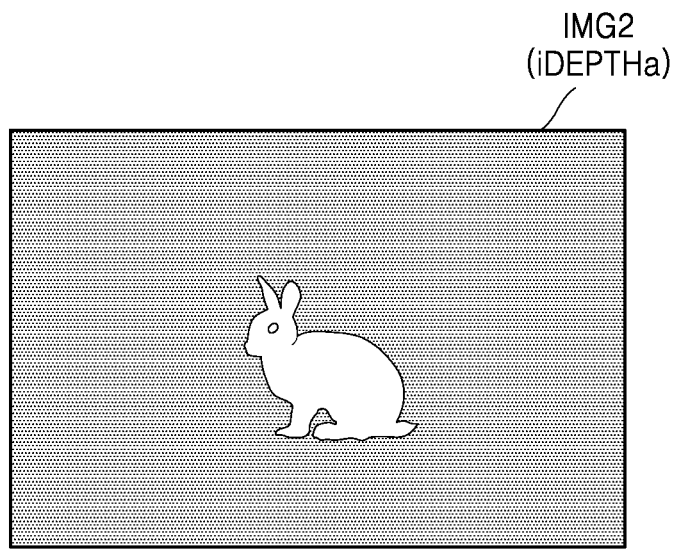
Figure 12C:
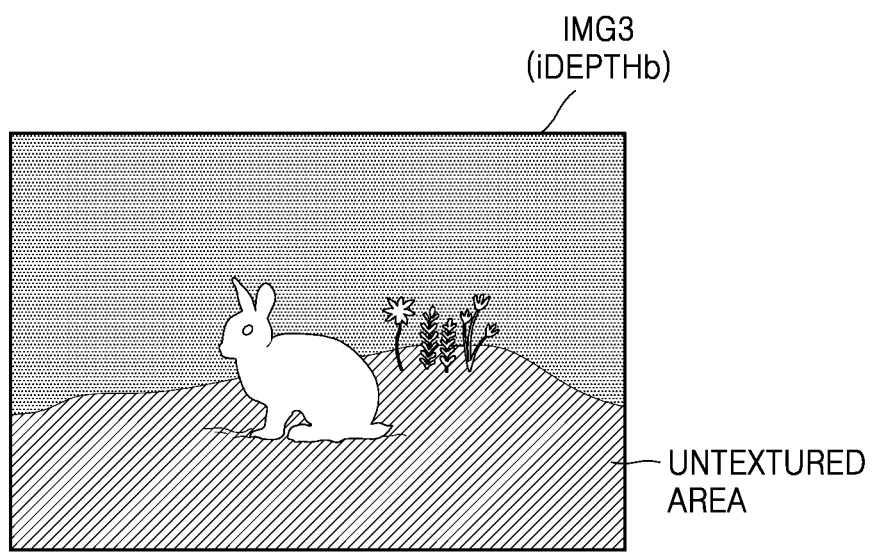

FIGS. 12A to 12C are diagrams illustrating a depth estimation result of image data according to an example embodiment of the inventive concept.

Referring to FIG. 12A, a first image IMG1 may include an object (rabbit) and a background. The first image IMG1 may correspond to image data IDAT. As the background of the first image IMG1, the hill may be understood as an untextured area in which the density of the image is sparse, and the occurrence of a sudden change in the boundary or an edge is small.

Referring to FIG. 12B, a second image IMG2 includes an object (rabbit) and a background, and represents a depth map corresponding to depth information iDEPTHa. The depth map may be an image containing a distance from an image sensor or an observation point to a surface of an object and information related to the distance, or a channel of the image, and a distance from a user's point of view (or an image sensor) to surfaces of objects contained on a screen may be identified as the depth information iDEPTHa.

The second image IMG2 may display the depth information iDEPTHa in shades. A lighter (or closer to white) portion may be defined as a portion having a smaller depth value, and a darker (or closer to black) portion may be defined as a portion having a larger depth value.

The depth information iDEPTHa is generated by the DFE 310a, the D.NET module 350a, and the post-processing layer 370a of FIG. 6A. According to an example embodiment of the inventive concept, the processing circuit 300a may achieve distinction between the object (rabbit) and the background by applying only the luminance data YDATa that is robust to low illuminance to an artificial neural network estimating an absolute depth.

Referring to FIG. 12C, a third image IMG3 includes an object (rabbit) and a background, and represents a depth map corresponding to depth information iDEPTHb.

The depth information iDEPTHb is generated by the DFE 310b, the S.NET module 330b, the D.NET module 350b, and the post-processing layer 370b of FIG. 6B. According to an example embodiment of the inventive concept, the processing circuit 300b may additionally fuse relative depth data with absolute depth data by using the S.NET module 330b, and thus, may achieve clear distinction between the object (rabbit) and the background even for data having a relatively small disparity. For example, an untextured area of the third image IMG3 is an area that has not been observed in the second image IMG2, and may prove that the depth map has been improved.

FIGS. 13A to 13D are diagrams illustrating a structure of a pixel according to an example embodiment of the inventive concept. Descriptions previously given with reference to FIGS. 13A to 13D are omitted.

Figure 13A:
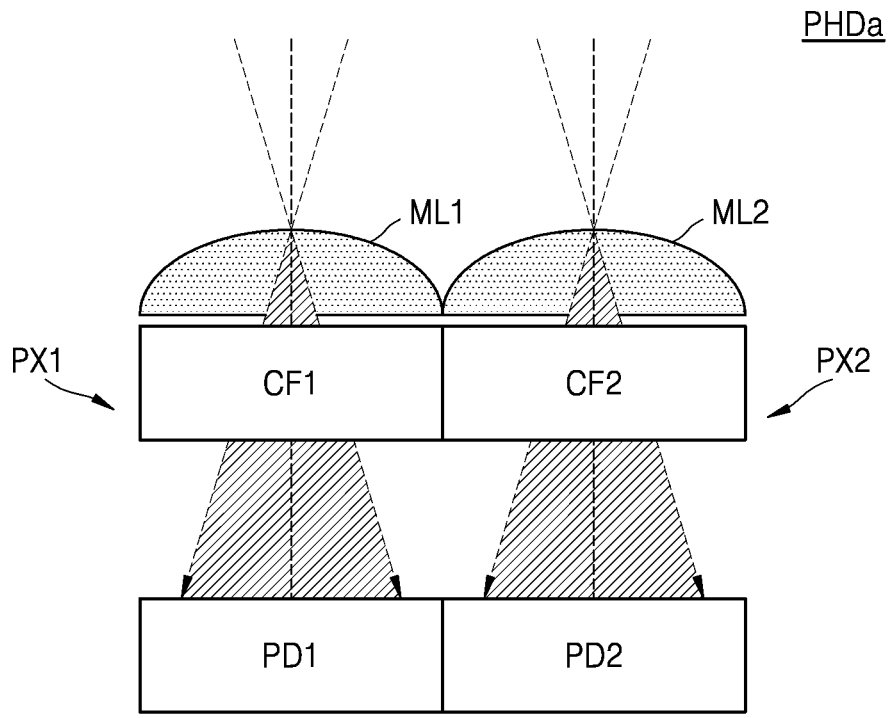
FIGS. 13A to 13D are diagrams illustrating a structure of a pixel according to an example embodiment of the inventive concept.

Referring to FIG. 13A, a pixel PHDa may include a microlens, a photoelectric conversion element, and a color filter. For example, each of a plurality of pixels PX1 and PX2 may include photodiodes PD1 and PD2, as an embodiment of the photoelectric conversion element, and color filters CF1 and CF2, and microlenses ML1 and ML2 may be provided on the color filters CF1 and CF2. According to an example embodiment, a vertical cross-sectional shape of the microlenses ML1 and ML2 may be an arc having a curvature of a circle, or a part of an ellipse.

According to the embodiment illustrated in FIG. 13A, one color filter CF1 or CF2 and one microlens ML1 or ML2 may be provided on one photodiode PD1 or PD2, respectively. For example, light incident on a center of the microlens ML1 may pass through the color filter CF1 such that only light of a specific wavelength band (for example, about 500 nanometers (nm) to about 600 nm corresponding to a green color) may be transmitted, and the transmitted light of the specific wavelength band may be imaged on the photodiode PD1. Similarly, light incident on a center of the microlens ML2 may pass through the color filter CF2 such that only light of a specific wavelength may be transmitted, and the transmitted light of the specific wavelength may be imaged on the photodiode PD2. As illustrated in FIG. 13A, when light incident on one microlens ML1 or ML2 is imaged on one photodiode PD1 or PD2, the photodiode may be referred to as a single-photodiode (single-PD). The image sensor 100 (FIG. 1) may calculate disparity according to a phase difference between the photodiodes PD1 and PD2 by using the pixel PHDa, thereby determining a distance to an object.

Figure 13B:
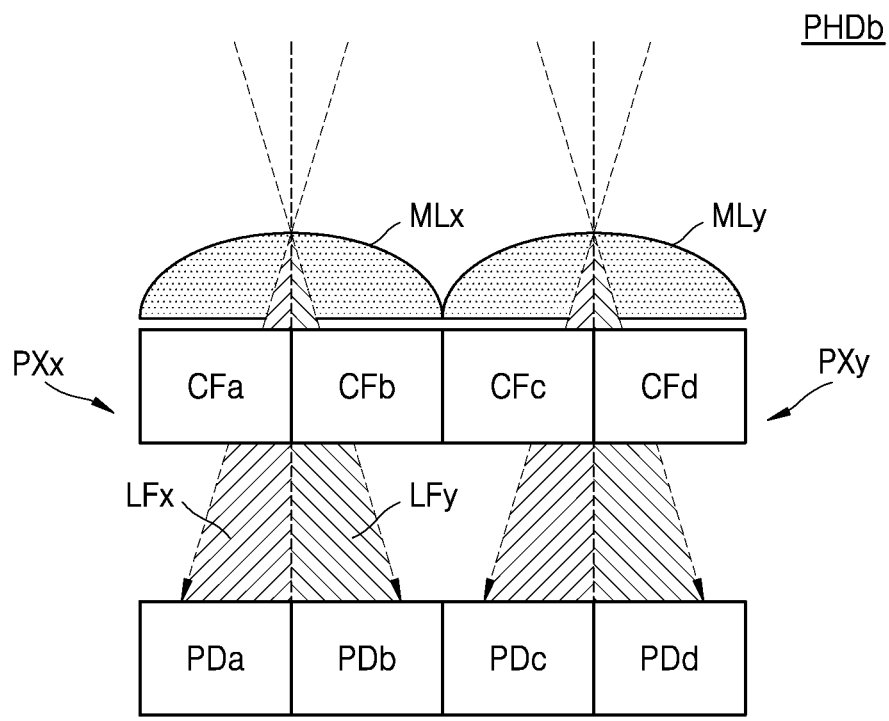

Referring to FIG. 13B, a dual pixel PHDb may include a microlens, a photoelectric conversion element, and a color filter. For example, a pixel PXx may include two color filters CFa and CFb and two photodiodes PDa and PDb respectively corresponding to the color filters CFa and CFb. Similarly, a pixel PXy may include two color filters CFc and CFd and two photodiodes PDc and PDd respectively corresponding to the color filters CFc and CFd.

According to the embodiment illustrated in FIG. 13B, the two color filters CFa and CFb and the two photodiodes PDa and PDb may be provided under one microlens MLx, respectively. For example, a first light flux LFx, which is a portion of light incident on a center of the microlens MLx, may pass through the color filter CFa to be imaged on the photodiode PDa. A second light flux LXy, which is the remaining portion of the light incident on the center of the microlens MLx, may pass through the color filter CFb to be imaged on the photodiode PDb. A phenomenon that is similar to that of the pixel PXx may also occur in the pixel PXy. As illustrated in FIG. 13B, when light incident on one microlens MLx or MLy is imaged on the two photodiodes PDa and PDb (or PDc and PDd), the photodiodes may be referred to as a dual-photodiode (dual-PD) or a dual pixel.

Figure 13C:
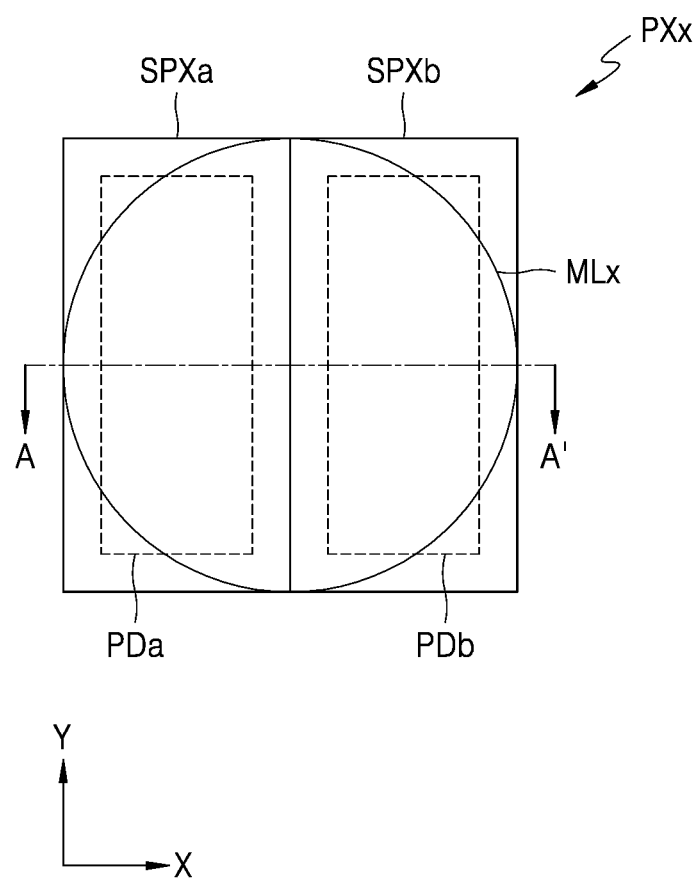

FIG. 13C is a plan view of the dual pixel PHDb of FIG. 13B. Referring to FIG. 13C, a pixel PXx may include a microlens MLx and two sub-pixels, for example, a first sub-pixel SPXa and a second sub-pixel SPXb. The first sub-pixel SPXa and the second sub-pixel SPXb may be arranged side by side in a row direction, for example, an X-axis direction (a first direction). For example, the first sub-pixel SPXa may be arranged on a left side in the pixel PXx, and the second sub-pixel SPXb may be arranged on a right side in the pixel PXx. The first sub-pixel SPXa and the second sub-pixel SPXb may include a first photodiode PDa and a second photodiode PDb, respectively.

According to an example embodiment, a sensing signal may be generated by the first photodiode PDa and the second photodiode PDb. For example, first image signals may be output by the first sub-pixel SPXa, and second image signals may be output by the second sub-pixel SPXb, respectively, and disparity according to a phase difference operation may be calculated based on the first and second image signals.

Figure 13D:
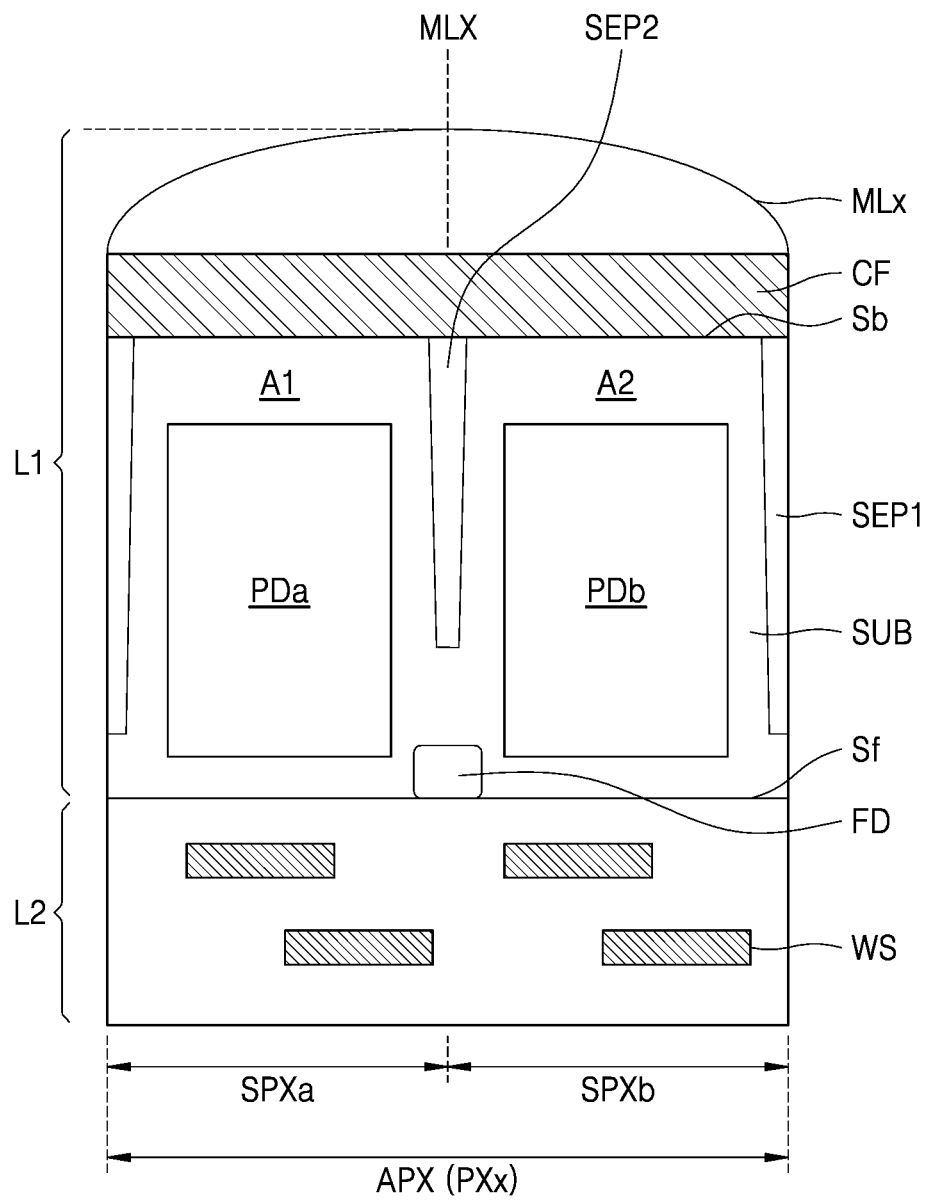

FIG. 13D shows a vertical cross-sectional view according to a line A-A' of FIG. 13C.

Referring to FIG. 13D, a pixel PXx may include a first layer L1 and a second layer L2 laminated in a Z-axis direction (for example, a third direction). The first layer L1 may be referred to as a photoelectric conversion layer, and may include a color filter CF formed on a substrate SUB, a microlens MLx, and two photoelectric conversion elements formed on the substrate SUB, for example, a first photodiode PDa and a second photodiode PDb. The second layer L2 may be referred to as a wiring layer, and a plurality of wirings WS may be formed in the second layer L2.

The substrate SUB may be a silicon wafer, a silicon on insulator (SOI) substrate, or a semiconductor epitaxial layer. The substrate SUB may include a first surface Sf and a second surface Sb opposite each other. For example, the first surface Sf may be a front surface of the substrate SUB, and the second surface Sb may be a rear surface of the substrate SUB. Light may be incident on the second surface Sb.

A plurality of pixel separation layers, for example, first and second pixel separation layers SEP1 and SEP2 (for example, a deep trench isolation (DTI) or P-type ion injection area), extending from the second surface Sb of the substrate SUB toward the first surface Sf may be formed on the substrate SUB, a pixel area APX in which the pixel PXx is formed may be separated by a plurality of relatively long first pixel separation layers SEP1 among the plurality of pixel separation layers SEP1 and SEP2, and the pixel area APX may be divided by a relatively short first pixel separation layer SEP1 into a first area A1 and a second area A2 in which a first sub-pixel SPXa and a second sub-pixel SPXb are formed. In an example embodiment, each of the first area A1 and the second area A2 may be doped with impurities of a first conductivity type (for example, a P-type). The first photodiode PDa and the second photodiode PDb may be formed in the first area A1 and the second area A2, respectively. For example, well areas doped with impurities of a second conductivity type (for example, an N-type) may be formed as the first photodiode PDa and the second photodiode PDb.

As illustrated, the first photodiode PDa and the second photodiode PDb may be arranged side by side in a first direction (for example, an X direction) or a second direction (for example, a Y direction) with respect to an optical axis MLX of the microlens MLx.

A floating diffusion node FD may be formed between the first photodiode PDa and the second photodiode PDb. In an embodiment, transistors may be formed between the first photodiode PDa and the second photodiode PDb and the first surface Sf, and signals may be transmitted to and received by the transistors through the plurality of wirings WS of the wiring layer L2.

Figure 14:
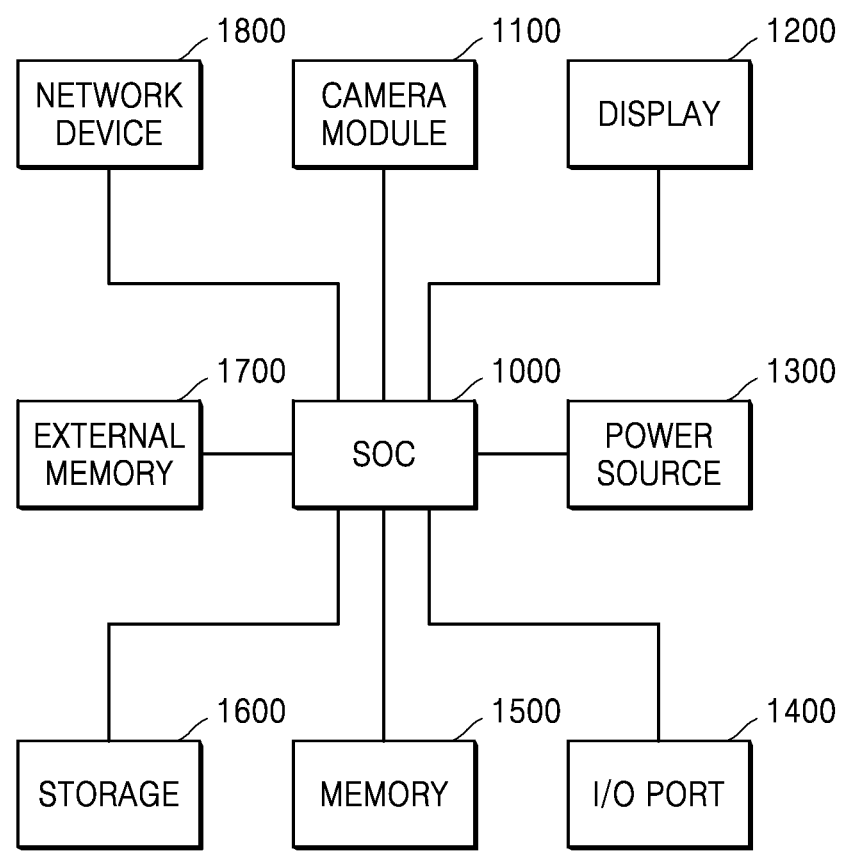
FIG. 14 is a block diagram illustrating an electronic system according to an example embodiment of the inventive concept.

FIG. 14 is a block diagram illustrating an electronic system 1 according to an example embodiment of the inventive concept.

Referring to FIG. 14, an SOC 1000 of FIG. 14 may be an application of the electronic device 10 of FIG. 1. Thus, the SOC 1000 of FIG. 14 may be designed to support the electronic device 10 of FIG. 1. The SOC 1000 shown in FIG. 14 may correspond to the electronic device 10 shown in FIG. 1. The SOC 1000 may control an operation of at least one of components.

The electronic system 1 may be implemented as a PC, a data server, or a portable electronic device. The portable electronic device may be implemented, for example, as a laptop computer, a mobile phone, a smartphone, a tablet PC, a PDA, an enterprise digital assistant (EDA), a digital still camera, a digital video camera, a PMP, a personal navigation device or portable navigation device (PND), a handheld game console, or an e-book.

The electronic system 1 may include the SOC 1000, a camera module 1100, a display 1200, a power source 1300, an input/output (I/O) port 1400, a memory 1500, a storage 1600, an external memory 1700, and a network device 1800.

The camera module 1100 refers to a module capable of converting an optical image into an electrical image. Accordingly, the electrical image output from the camera module 1100 may be stored in the storage 1600, the memory 1500, or the external memory 1700. In addition, the electrical image output from the camera module 1100 may be displayed through the display 1200. The camera module 1100 may include the image sensor 100 or the image sensor 100 and the ISP 200 of FIG. 1.

The display 1200 may display data output from the storage 1600, the memory 1500, the I/O port 1400, the external memory 1700, or the network device 1800. The power source 1300 may supply an operating voltage to at least one of the components. The I/O port 1400 refers to ports capable of transmitting data to the electronic system 1 or transmitting data output from the electronic system 1 to an external device. For example, the I/O port 1400 may be a port for connecting to a pointing device such as a computer mouse, a port for connecting to a printer, or a port for connecting to a USB drive.

The memory 1500 may be implemented as a volatile or non-volatile memory. According to an embodiment, a memory controller capable of controlling a data access operation with respect to the memory 1500, for example, a read operation, a write operation (or program operation), or an erase operation, may be integrated or embedded in the SOC 1000. According to another embodiment, the memory controller may be implemented between the SOC 1000 and the memory 1500.

The storage 1600 may be implemented as a hard disk drive or a solid state drive (SSD).

The external memory 1700 may be implemented as a secure digital (SD) card or a multimedia card (MMC). According to an embodiment, the external memory 1700 may be a subscriber identification module (SIM) card or a universal subscriber identity module (USIM) card.

The network device 1800 refers to a device for connecting the electronic system 1 to a wired network or a wireless network.

Figure 15:
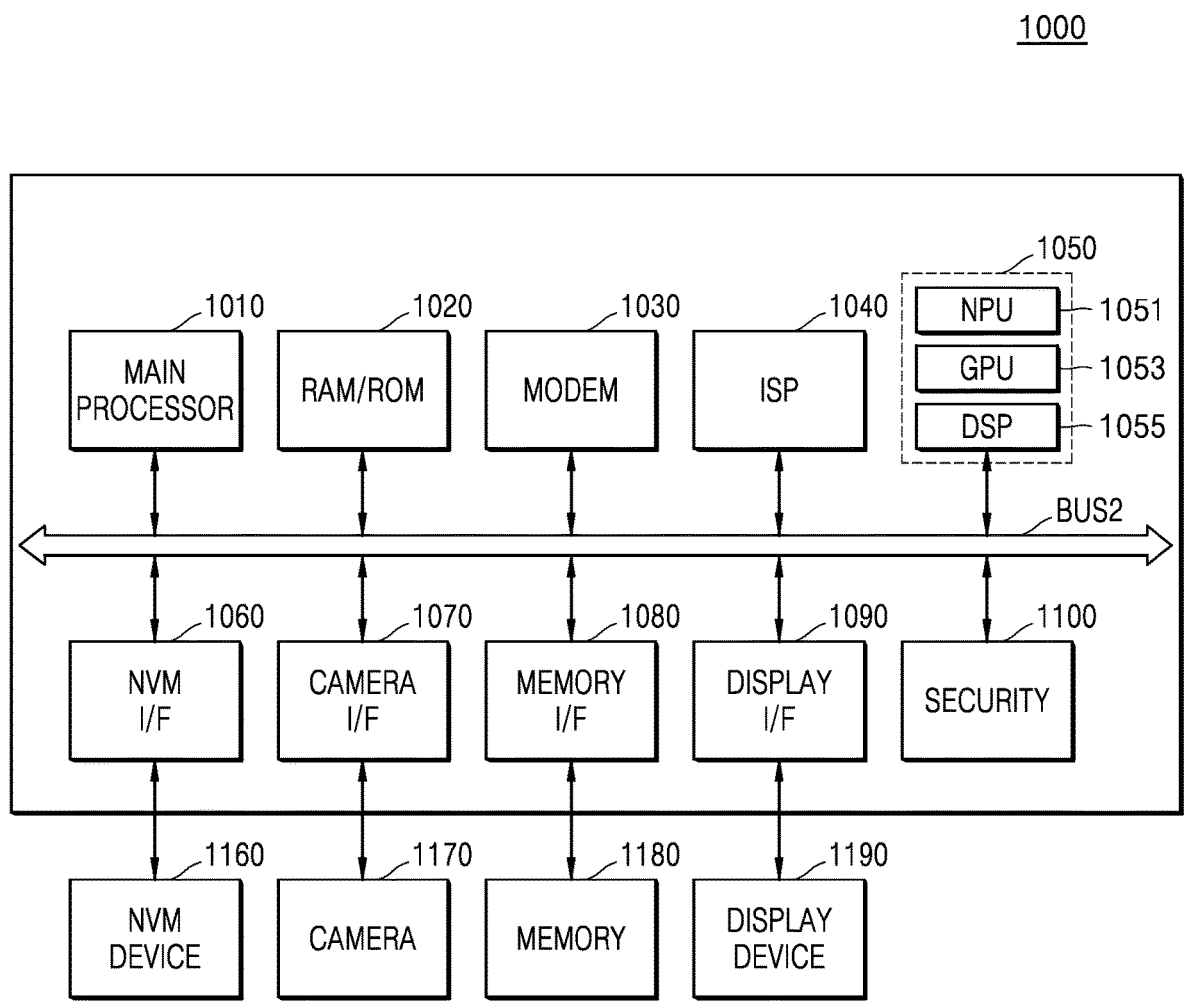
FIG. 15 is a block diagram illustrating an example embodiment of the system-on-chip of FIG. 14.

FIG. 15 is a block diagram illustrating an example embodiment of the SOC 1000 of FIG. 14.

Referring to FIG. 15, the SOC 1000 may include a main processor 1010, a random access memory/read only memory (RAM/ROM) 1020, a modem 1030, an ISP 1040, an accelerator module 1050 including an NPU 1051, a GPU 1053, and a DSP 1055, a non-volatile memory interface 1060, a camera interface 1070, a memory interface 1080, and a display interface 1090. Components of the SOC 1000, that is, the main processor 1010, the ROM/RAM 1020, the modem 1030, the ISP 1040, the non-volatile memory interface 1060, the camera interface 1070, the memory interface 1080, and the display interface 1090, may transmit and receive data through a second bus BUS2.

The main processor 1010 may control overall operations of the SOC 1000. The main processor 1010 may be implemented, for example, as a CPU, a microprocessor, an ARM processor, an X86 processor, a MIPS processor, or the like. In some embodiments, the main processor 1010 may be implemented as one computing component having two or more independent processors (or cores), that is, a multi-core processor. The main processor 1010 may process or execute a command code (for example, an instruction) and/or data stored in the ROM/RAM 1020.

The RAM/ROM 1020 may temporarily store programs, data, and/or instructions. According to an embodiment, the RAM 1020 may be implemented as a DRAM or a SRAM. The RAM 1020 may be input and output through the interfaces 1060, 1070, 1080, and 1090, or may temporarily store data image-processed by the ISP 1040.

The non-volatile memory interface 1060 may interface data input from a non-volatile memory device 1160 or data output to a non-volatile memory. The non-volatile memory device 1160 may be implemented, for example, as a memory card (an MMC, an embedded MMC (eMMC), an SD card, a micro SD card, or the like).

The camera interface 1070 may interface image data (for example, raw image data) input from a camera 1170 located outside the SOC 1000. The camera 1170 may generate data for an image taken by using a plurality of photoelectric conversion elements. The image data received through the camera interface 1070 may be provided to the ISP 1040 or stored in a memory 1180 through the memory interface 1080.

The memory interface 1080 may interface data input from the memory 1180 or data output to the memory 1180. According to an embodiment, the memory 1180 may be implemented as a volatile memory such as a DRAM or an SRAM, or as a non-volatile memory such as a RRAM, a PRAM, or a NAND flash memory.

The display interface 1090 may interface data (for example, image data) output to a display device 1190. The display device 1190 may output an image signal according to image data through a display such as a liquid-crystal display (LCD), an active-matrix organic light-emitting diode (AMOLED), or the like.

The ISP 1040 may generate converted image data by performing image processing on the image data provided by the camera 1170, and may store the converted image data in the memory 1180, or may scale the converted image data and provide the scaled image to the display device 1190. In addition, the SOC 1000 may further include a security device 1100 including a secure method, a protocol, and encryption and decryption keys.

While the inventive concept has been particularly shown and described with reference to embodiments thereof, it will be understood that various changes in form and details may be made therein without departing from the spirit and scope of the following claims.

What is claimed is:

1. An electronic device configured to generate depth information, the electronic device comprising:
 a memory storing one or more instructions and image data, the image data including luminance data and chrominance data; and
 at least one processing circuit configured to generate the depth information on the image data, by executing the one or more instructions,
 wherein the at least one processing circuit is configured to obtain luminance data of the image data, generate absolute depth data for the luminance data by using the luminance data without the chrominance data and using a first artificial neural network configured to extract disparity features, and generate the depth information based on the absolute depth data;
 wherein the at least one processing circuit is further configured to generate relative depth data for the absolute depth data by using a second artificial neural network configured to estimate a relative depth based on features of a scene corresponding to the image data; and
 wherein the at least one processing circuit is further configured to fuse the absolute depth data with the relative depth data by using a third artificial neural network.

2. The electronic device of claim 1, wherein:
 the at least one processing circuit comprises a first processing circuit and a second processing circuit,
 the first processing circuit is configured to use the first artificial neural network, and
 the second processing circuit is configured to use the second artificial neural network.

3. The electronic device of claim 1, wherein the third artificial neural network comprises an activation layer and a plurality of convolution layers, the activation layer comprising at least one rectified linear unit (ReLU) function.

4. The electronic device of claim 1, wherein:
 the second artificial neural network comprises a plurality of encoders and a plurality of decoders, and
 the plurality of encoders and the plurality of decoders are implemented in a symmetrical pyramid structure.

5. The electronic device of claim 4, wherein:
 the plurality of encoders are connected in series to gradually decrease a resolution of encoding data, and the plurality of decoders are connected in series to gradually increase a resolution of decoding data.

6. The electronic device of claim 1, wherein the first artificial neural network comprises an activation layer and three convolution layers, the activation layer comprising at least one rectified linear unit (ReLU) function.

7. The electronic device of claim 1, wherein the image data is generated by a dual pixel configured such that at least two of a plurality of photoelectric conversion elements share one microlens.

8. An electronic device comprising:
an image sensor configured to sense an object by using a plurality of photoelectric conversion elements and generate image data having disparity, wherein at least two of the plurality of photoelectric conversion elements comprise a dual pixel that shares one microlens;
a memory storing one or more instructions and the image data; and
at least one processing circuit configured to generate depth information based on separated luminance data of the image data by executing the one or more instructions,
wherein the at least one processing circuit is configured to generate absolute depth data for the image data by using a first artificial neural network configured to estimate an absolute depth of the image data, generate relative depth data for the absolute depth data by using a second artificial neural network configured to estimate a relative depth based on a shape of a scene corresponding to the image data, and generate the depth information by fusing the absolute depth data with the relative depth data by using a third artificial neural network.

9. The electronic device of claim 8, wherein the image data comprises luminance data conforming to a YUV format.

10. The electronic device of claim 8, wherein the first artificial neural network is configured to learn about a textured image having dense image features in advance of generating the depth information.

11. The electronic device of claim 8, wherein the first artificial neural network is implemented to receive two pairs of pieces of the image data having disparity as an input and generate one piece of the absolute depth data as an output.

12. The electronic device of claim 8, wherein the second artificial neural network is configured to learn about an entirety of the scene corresponding to the image data by encoding an image while sequentially decreasing a resolution thereof.

13. The electronic device of claim 8, wherein the second artificial neural network is configured to extract features of an untextured image having sparse image features.

14. The electronic device of claim 8, wherein the second artificial neural network is implemented to receive one piece of the absolute depth data as an input and generate one piece of the relative depth data as an output.

15. The electronic device of claim 8, wherein:
the at least one processing circuit comprises a first processing circuit and a second processing circuit,
the first processing circuit is configured to use the first artificial neural network, and
the second processing circuit is configured to use the second artificial neural network.

16. The electronic device of claim 8, wherein the first artificial neural network and the second artificial neural network comprise an activation layer and a plurality of convolution layers, the activation layer comprising at least one rectified linear unit (ReLU) function.

17. The electronic device of claim 8, wherein:
the second artificial neural network comprises a plurality of encoders and a plurality of decoders, and
the plurality of encoders and the plurality of decoders are implemented in a symmetrical pyramid structure.

18. A method, performed by a processing circuit, of generating depth information on image data, the method comprising:
obtaining, from a memory, luminance data conforming to a YUV format from the image data, the luminance data being separate from chrominance data of the image data;
generating absolute depth data by applying disparity feature learning to the luminance data by using a first artificial neural network;
generating relative depth data by applying scene learning to the absolute depth data by using a second artificial neural network; and
generating the depth information by fusing the absolute depth data with the relative depth data by using a third artificial neural network.

19. The method of claim 18, wherein the image data has disparity due to being generated by a dual pixel configured such that at least two of a plurality of photoelectric conversion elements share one microlens.

* * * * *